(12) United States Patent
Bai et al.

(10) Patent No.: US 12,341,161 B2
(45) Date of Patent: Jun. 24, 2025

(54) ELECTRODE ASSEMBLY, BATTERY CELL, BATTERY AND ELECTRIC APPARATUS

(71) Applicant: CONTEMPORARY AMPEREX TECHNOLOGY (HONG KONG) LIMITED, Hong Kong (CN)

(72) Inventors: Ziyu Bai, Ningde (CN); Huihui Shangguan, Ningde (CN); Xinxin Du, Ningde (CN); Yang Hu, Ningde (CN); Daichun Tang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 677 days.

(21) Appl. No.: 17/543,850

(22) Filed: Dec. 7, 2021

(65) Prior Publication Data

US 2022/0311054 A1    Sep. 29, 2022

Related U.S. Application Data

(63) Continuation of application No. PCT/CN2021/083417, filed on Mar. 26, 2021.

(51) Int. Cl.
*H01M 10/0585* (2010.01)
*H01M 4/38* (2006.01)
(Continued)

(52) U.S. Cl.
CPC ......... *H01M 10/0585* (2013.01); *H01M 4/38* (2013.01); *H01M 4/70* (2013.01);
(Continued)

(58) Field of Classification Search
CPC .......... H01M 4/13–1399; H01M 10/058–0587
See application file for complete search history.

(56) References Cited

U.S. PATENT DOCUMENTS

| | | | |
|---|---|---|---|
| 9,343,731 B2 | 5/2016 | Harayama et al. | |
| 2012/0021274 A1* | 1/2012 | Kim | H01M 10/4235 |
| | | | 429/151 |

(Continued)

FOREIGN PATENT DOCUMENTS

| | | | | |
|---|---|---|---|---|
| CN | 104471777 A | | 3/2015 | |
| CN | 105958124 A | * | 9/2016 | ........ H01M 10/0525 |

(Continued)

OTHER PUBLICATIONS

Espacenet machine translation of KR-20150049519-A (Year: 2015).*

(Continued)

*Primary Examiner* — Jonathan G Leong
*Assistant Examiner* — Katharine A Caughron
(74) *Attorney, Agent, or Firm* — Scully, Scott, Murphy & Presser, P.C.

(57) ABSTRACT

The present application provides an electrode assembly, a batter cell, a battery, an electric apparatus, and a manufacturing method and device of the electrode assembly. A negative plate of the electrode assembly includes a plurality of first negative active material layers located in an abutting region, and a plurality of second negative active material layers located in a non-abutting region; a positive plate of the electrode assembly includes a plurality of first positive active material layers located in the abutting region, and a plurality of second positive active material layers located in the non-abutting region. An active material capacity per unit area of the first negative active material layer is greater than that of the second negative active material layer; and/or an active material capacity per unit area of the first positive active material layer is less than that of the second positive active material layer.

20 Claims, 13 Drawing Sheets

(51) Int. Cl.
*H01M 4/70*       (2006.01)
*H01M 10/0525*    (2010.01)
*H01M 50/209*     (2021.01)

(52) U.S. Cl.
CPC ...... *H01M 50/209* (2021.01); *H01M 10/0525* (2013.01); *H01M 2220/20* (2013.01)

(56) References Cited

U.S. PATENT DOCUMENTS

| | | |
|---|---|---|
| 2015/0207136 A1 | 7/2015 | Harayama et al. |
| 2020/0220140 A1* | 7/2020 | Xu .................... H01M 10/0431 |
| 2022/0052386 A1 | 2/2022 | Wang et al. |

FOREIGN PATENT DOCUMENTS

| | | | | |
|---|---|---|---|---|
| CN | 111916844 A | | 11/2020 | |
| JP | 2020170697 A | | 10/2020 | |
| KR | 20050121512 A | * | 12/2005 | |
| KR | 20150049519 A | * | 5/2015 | ........ H01M 10/0422 |

OTHER PUBLICATIONS

Espacenet machine translation of CN-105958124-A (Year: 2016).*
Espacenet machine translation of KR-20050121512-A (Year: 2005).*
Extended European Search Report dated Oct. 17, 2022 received in European Patent Application No. EP 21809893.7.

* cited by examiner

ELECTRODE ASSEMBLY, BATTERY CELL, BATTERY AND ELECTRIC APPARATUS

CROSS-REFERENCE TO RELATED APPLICATIONS

This application is a continuation of International Application No. PCT/CN2021/083417, filed on Mar. 26, 2021, the disclosure of which is hereby incorporated by reference in its entirety.

FIELD OF TECHNOLOGY

The present application relates to the technical field of batteries, in particular to an electrode assembly, a battery cell, a battery, an electric apparatus, and a manufacturing method and device of the electrode assembly.

BACKGROUND

With booming development of smartphones, tablet computers, electric vehicles and the like, lithium-ion batteries have been increasingly widely applied, and accordingly requirements on the lithium-ion batteries become higher. People are pursuing a better electric property of a lithium battery while concerning its safety property. Whereas, lithium plating is one of major factors having an effect on the electric property and safety property of a battery, once lithium plating of a cell happens, the electric property of the battery is reduced, dendrites are easily formed as a result of accumulation of a lithium plating amount, and the dendrites may piece through a separator to cause short circuit in the battery and further cause potential safety hazard.

Therefore, how to effectively avoid or reduce the risk of lithium plating of a battery has become a technical problem to be urgently resolved at current.

SUMMARY

The embodiments of the present application provide an electrode assembly, a battery cell, a battery, an electric apparatus, and a manufacturing method and device of the electrode assembly to effectively reduce the risk of lithium plating of a battery.

On the first aspect, the embodiments of the present application provide an electrode assembly configured to be accommodated in a housing. The electrode assembly includes a positive plate and a negative plate, and the positive plate and the negative plate are stacked and winded around a winding axis. The electrode assembly includes an abutting region configured to abut against the housing and a non-abutting region not abutting against the housing at two sides of a thickness central surface thereof, and the thickness central surface is perpendicular to a thickness direction of the electrode assembly and passes through the winding axis. The negative plate includes a plurality of first negative active material layers located in the abutting region and stacked along the thickness direction, and a plurality of second negative active material layers located in the non-abutting region and stacked along the thickness direction; the positive plate includes a plurality of first positive active material layers located in the abutting region and stacked along the thickness direction, and a plurality of second positive active material layers located in the non-abutting region and stacked along the thickness direction; an active material capacity per unit area of the first negative active material layer is greater than that of the second negative active material layer; and/or, an active material capacity per unit area of the first positive active material layer is less than that of the second positive active material layer.

In the above technical solution, if a lithium ion de-intercalating from an anode is unable to enter into a cathode, the lithium ion has no choice but to separate out on a surface of the cathode so as to form a grey substance, i.e., lithium plating. When an active material capacity per unit area of the second negative active material layer of the non-abutting region not abutting against the housing meets a design requirement, i.e., when the active material capacity per unit area of the second negative active material layer of the non-abutting region meets a first preset value, the possibility of lithium plating that would occur in the second negative active material layer of the non-abutting region is rare. When the active material capacity per unit area of the first negative active material layer of the abutting region is greater than that of the second negative active material layer of the non-abutting region, i.e., when the active material capacity per unit area of the first negative active material layer is greater than a first preset value, it corresponds to increasing the active material capacity per unit area of the first negative active material layer, so that the first negative active material layer can receive lithium ions de-intercalating from the first positive active material layer, and the possibility of lithium plating in the first negative active material layer of the abutting region is small. Therefore, the risk of lithium plating due to extrusion of an electrolyte when the abutting region abuts against the housing can be effectively reduced.

When an active material capacity per unit area of the second positive active material layer of the non-abutting region not abutting against the housing meets a design requirement, i.e., when the active material capacity per unit area of the second positive active material layer of the non-abutting region meets a second preset value, the possibility of lithium plating that would occur in the second negative active material layer of the non-abutting region is rare. When the active material capacity per unit area of the first positive active material layer of the abutting region is less than that of the second positive active material layer of the non-abutting region, i.e., the active material capacity per unit area of the first positive active material layer is less than a second preset value, it corresponds to lowering the active material capacity per unit area of the first positive active material layer, so that the first negative active material layer can receive lithium ions de-intercalating from the first positive active material layer, and the possibility of lithium plating in the first negative active material layer of the abutting region is low. Therefore, the risk of lithium plating due to extrusion of an electrolyte when the abutting region abuts against the housing can be effectively reduced.

In some embodiments of the first aspect, a capacity per gram of an active material of the first negative active material layer is greater than that of an active material of the second negative active material layer; and/or, a capacity per gram of an active material of the first positive active material layer is less than that of an active material of the second positive active material layer.

In the above technical solution, by increasing the capacity per gram of the active material of the first negative active material layer of the abutting region, the active material capacity per unit area of the first negative active material layer of the abutting region is increased, so that the active material capacity per unit area of the first negative active material layer of the abutting region is greater than that of the second negative active material layer of the non-abutting region; and/or, by reducing the capacity per gram of the active material of the first positive active material layer of the abutting region, the active material capacity per unit area of the first positive active material layer of the abutting region is lowered, so that the active material capacity per unit area of the first positive active material layer of the abutting region is less than that of the second positive active material layer of the non-abutting region. Therefore, the risk of lithium plating due to extrusion of an electrolyte when the abutting region abuts against the housing is effectively reduced.

In some embodiments of the first aspect, a ratio of a weight of the active material of the first negative active material layer to a weight of the first negative active material layer is greater than a ratio of a weight of the active material of the second negative active material layer to a weight of the second negative active material layer; and/or, a ratio of a weight of the active material of the first positive active material layer to a weight of the first positive active material layer is less than a ratio of a weight of the active material of the second positive active material layer to a weight of the second positive active material layer.

In the above technical solution, by increasing the active material in the first negative active material layer of the abutting region, a weight ratio of the active material in the first negative active material layer of the abutting region is improved, thereby increasing the active material capacity per unit area of the first negative active material layer of the abutting region; and/or, by lowering the active material in the first positive active material layer of the abutting region, a weight ratio of the active material in the first positive active material layer of the abutting region is lowered, thereby lowering the active material capacity per unit area of the first positive active material layer of the abutting region. Therefore, the risk of lithium plating due to extrusion of an electrolyte when the abutting region abuts against the housing is effectively reduced.

In some embodiments of the first aspect, an active material capacity per unit area of one first negative active material layer of two adjacent first negative active material layers is greater than that of the other first negative active material layer, and the other first negative active material layer is closer to the thickness central surface than the one first negative active material layer; and/or, an active material capacity per unit area of one first positive active material layer of two adjacent first positive active material layers is less than that of the other first positive active material layer, and the other first positive active material layer is closer to the thickness central surface than the one first positive active material layer.

In the above technical solution, in the abutting region, the closer the first negative active material layer or the first positive active material layer approaches the housing, the more seriously the first negative active material layer or the first positive active material layer is extruded, and an active material capacity per unit area of one first negative active material layer of two adjacent first negative active material layers closer to the housing but further away from the thickness central surface is greater than that of the other first negative active material layer; and/or, an active material capacity per unit area of one first positive active material layer of two adjacent first positive active material layers closer to the housing but further away from the thickness central surface is less than that of the other first positive active material layer. Therefore, the risk of lithium plating due to extrusion of an electrolyte when the abutting region abuts against the housing is effectively reduced.

In some embodiments of the first aspect, a capacity per gram of an active material of one first negative active material layer of two adjacent first negative active material layers is greater than that of an active material of the other first negative active material layer, and the other first negative active material layer is closer to the thickness central surface than the one first negative active material layer; and/or, a capacity per gram of an active material of one first positive active material layer of two adjacent first positive active material layers is less than that of an active material of the other first positive active material layer, and the other first positive active material layer is closer to the thickness central surface than the one first positive active material layer.

In the above technical solution, by increasing the capacity per gram of the active material of one first negative active material layer of two adjacent first negative active material layers closer to the housing, the active material capacity per unit area of the first negative active material layer is increased, so that the active material capacity per unit area of one first negative active material layer of two adjacent first negative active material layers closer to the housing is greater than that of the other first negative active material layer; and/or, by lowering the capacity per gram of the active material of one first positive active material layer of two adjacent first positive active material layers closer to the housing, the active material capacity per unit area of the first positive active material layer is lowered, so that the active material capacity per unit area of one first positive active material layer of two adjacent first positive active material layers closer to the housing is less than that of the other first positive active material layer. Therefore, the risk of lithium plating due to extrusion of an electrolyte when the abutting region abuts against the housing is effectively reduced.

In some embodiments of the first aspect, a ratio of a weight of an active material of one first negative active material layer of two adjacent first negative active material layers to a weight of the one first negative active material layer is greater than a ratio of a weight of an active material of the other first negative active material layer to a weight of the other first negative active material layer, and the other first negative active material layer is closer to the thickness central surface than the one first negative active material layer; and/or, a ratio of a weight of an active material of one first positive active material layer of two adjacent first positive active material layers to a weight of the one first positive active material layer is less than a ratio of a weight of an active material of the other first positive active material layer to a weight of the other first positive active material layer, and the other first positive active material layer is closer to the thickness central surface than the one first positive active material layer.

In the above solution, by increasing the active material in one first negative active material layer of two adjacent first negative active material layers closer to the housing, a weight ratio of the active material in the first negative active material layer is increased, thereby increasing the active material capacity per unit area of the first negative active material layer of two adjacent first negative active material layers closer to the housing; and/or, by lowering the active material in one first positive active material layer of two adjacent first positive active material layers closer to the housing, a weight ratio of the active material in the first positive active material layer is lowered, thereby lowering the active material capacity per unit area of the first positive active material layer of two adjacent first positive active material layers closer to the housing. Therefore, the risk of lithium plating due to extrusion of an electrolyte when the abutting region abuts against the housing is effectively reduced.

In some embodiments of the first aspect, the first negative active material layer includes a plurality of negative active sections, and the first positive active material layer includes a plurality of positive active sections; an active material capacity per unit area of one negative active section of two adjacent negative active sections is greater than that of the other negative active section, and the one negative active section is closer to a center of the first negative active material layer than the other negative active section; and/or, an active material capacity per unit area of one positive active section of two adjacent positive active sections is less than that of the other positive active section, and the one positive active section is closer to a center of the first positive active material layer than the other positive active section.

In the above solution, the closer the first negative active material layer and the first positive active material layer approach respective central position, the more seriously they are extruded. Therefore, the active material capacity per unit area of one negative active section of two adjacent negative active sections closer to a center of the first negative active material layer is greater than that of the other negative active section, and/or, the active material capacity per unit area of one positive active section of two adjacent positive active sections closer to a center of the first positive active material layer is less than that of the other positive active section. Therefore, the risk of lithium plating due to extrusion of an electrolyte when the abutting region abuts against the housing is effectively reduced.

In some embodiments of the first aspect, a capacity per gram of an active material of one negative active section of two adjacent negative active sections is greater than that of an active material of the other negative active section, and the one negative active section is closer to the center of the first negative active material layer than the other negative active section; and/or, a capacity per gram of an active material of one positive active section of two adjacent positive active sections is less than that of an active material of the other positive active section, and the one positive active section is closer to the center of the first positive active material layer than the other positive active section.

In the above solution, by increasing the capacity per gram of the active material of one negative active section of two adjacent negative active sections closer to the center of the first negative active material layer, the active material capacity per unit area of the negative active section is increased, so that the active material capacity per unit area of one negative active section of two adjacent negative active sections closer to the center of the first negative active material layer is greater than that of the other negative active section; and/or, by lowering the capacity per gram of the active material of one positive active section of two adjacent positive active sections closer to the center of the first positive active material layer, the active material capacity per unit area of the positive active section is lowered, so that the active material capacity per unit area of one positive active section of two adjacent positive active sections closer to the center of the first positive active material layer is less than that of the other positive active section. Therefore, the risk of lithium plating due to extrusion of an electrolyte when the abutting region abuts against the housing is effectively reduced.

In some embodiments of the first aspect, a ratio of a weight of an active material of one negative active section of two adjacent negative active sections to a weight of the one negative active section is greater than a ratio of a weight of an active material of the other negative active section to a weight of the other negative active section, and the one negative active section is closer to the center of the first negative active material layer than the other negative active section; and/or, a ratio of a weight of an active material of one positive active section of two adjacent positive active sections to a weight of the one positive active section is less than a ratio of a weight of an active material of the other positive active section to a weight of the other positive active section, and the one positive active section is closer to the center of the first positive active material layer than the other positive active section.

In the above technical solution, by increasing the active material of one negative active section of two adjacent negative active sections closer to the center of the first negative active material layer, the weight ratio of the active material in the negative active section is increased, so that the active material capacity per unit area of the negative active section is increased; and/or, by lowering the active material of one positive active section of two adjacent positive active sections closer to the center of the first positive active material layer, the weight ratio of the active material in the positive active section is lowered, so that the active material capacity per unit area of the positive active section is lowered. Therefore, the risk of lithium plating due to extrusion of an electrolyte when the abutting region abuts against the housing is effectively reduced.

In some embodiments of the first aspect, each negative active section is a strip shape, and the plurality of negative active sections are arranged along the direction of the winding axis; and/or, each positive active section is a strip shape, and the plurality of positive active sections are arranged along the direction of the winding axis.

In the above solution, the negative active section and/or the positive active section are/is a strip shape, and a negative active material layer is convenient to coat.

In some embodiments of the first aspect, the plurality of negative active sections include a central negative active section and at least one peripheral negative active section, each peripheral negative active section is annular and encircles the central negative active section, the central negative active section and the at least one peripheral negative active section are radially distributed around the center of the first negative active material layer; and/or, the plurality of positive active sections include a central positive active section and at least one peripheral positive active section, each peripheral positive active section is annular and encircles the central positive active section, the central positive active section and the at least one peripheral positive active section are radially distributed around the center of the first positive active material layer.

In the above technical solution, each negative active section encircles the center of the first negative active material layer, and along arbitrary one direction, an active material capacity per unit area of one negative active section of two adjacent negative active sections closer to the center is greater than that of the other negative active section; and/or, each positive active section encircles the center of the first positive active material layer, and along arbitrary one direction, an active material capacity per unit area of one positive active section of two adjacent positive active sections closer to the center is less than that of the other positive active section. Therefore, the risk of lithium plating due to extrusion of an electrolyte when the abutting region abuts against the housing is effectively reduced.

In some embodiments of the first aspect, the central negative active section and/or the central positive active section are/is an oval shape.

In the above technical solution, the central negative active section and/or the central positive active section are/is an oval shape, so that the first negative active material layer and the first positive active material layer are able to more closely approach to expansive deformation status when the abutting region abuts against the housing, thereby advantageously reducing the risk of lithium plating due to extrusion of an electrolyte when the abutting region abuts against the housing.

On the second aspect, the embodiments of the present application provide a battery cell, including: a housing; an electrode assembly according to any of the embodiments of the first aspect, the electrode assembly being accommodated in the housing, the abutting region being configured to abut against the housing, and the non-abutting region being configured to not abut against the housing.

In the above technical solution, the active material capacity per unit area of the first negative active material layer of the abutting region of the electrode assembly is enabled to be greater than that of the second negative active material layer of the non-abutting region; and/or, the active material capacity per unit area of the first positive active material layer of the abutting region of the electrode assembly is enabled to be less than that of the second positive active material layer of the non-abutting region. Therefore, the risk of lithium plating due to extrusion of an electrolyte when the abutting region abuts against the housing is effectively reduced when the battery cell works.

In some embodiments of the second aspect, the battery cell includes two electrode assemblies, the two electrode assemblies are arranged side by side along the thickness direction, and the abutting regions of the two electrode assemblies deviate from each other.

In the above solution, as the two electrode assemblies are arranged side by side along the thickness direction, it is certain that there are two areas possibly abutting against the inside of the housing. The abutting regions of the two electrode assemblies deviate from each other, and otherwise, the non-abutting regions of the two electrode assemblies approach to each other, in such a case, both of the abutting regions of the two electrode assemblies can abut against the housing, therefore, the risk of lithium plating due to extrusion of an electrolyte when the abutting regions on two ends in the arrangement direction of the electrode assemblies abut against the housing is effectively reduced when the battery cell works.

On the third aspect, the embodiments of the present application provide a battery, including a battery cell provided by any of the embodiments of the second aspect.

In the above technical solution, the active material capacity per unit area of the first negative active material layer of the abutting region of the electrode assembly is enabled to be greater than that of the second negative active material layer of the non-abutting region; and/or, the active material capacity per unit area of the first positive active material layer of the abutting region of the electrode assembly is enabled to be less than that of the second positive active material layer of the non-abutting region. Therefore, the risk of lithium plating due to extrusion of an electrolyte when the abutting region of the electrode assembly abuts against the housing is effectively reduced when the battery cell works.

On the fourth aspect, the embodiments of the present application provide an electric apparatus, including a battery cell provided by any of the embodiments of the second aspect.

On the fifth aspect, the embodiments of the present application provide a manufacturing method of an electrode assembly, including: providing a positive plate and a negative plate; stacking the positive plate and the negative plate and winding the positive plate and the negative plate around a winding axis to form a winding structure, so that the electrode assembly includes an abutting region configured to abut against a housing and a non-abutting region not abutting against the housing at two sides of a thickness central surface of the electrode assembly, and the thickness central surface is perpendicular to a thickness direction of the electrode assembly and passes through the winding axis; where the negative plate includes a plurality of first negative active material layers located in the abutting region and stacked along the thickness direction, and a plurality of second negative active material layers located in the non-abutting region and stacked along the thickness direction; the positive plate includes a plurality of first positive active material layers located in the abutting region and stacked along the thickness direction, and a plurality of second positive active material layers located in the non-abutting region and stacked along the thickness direction; an active material capacity per unit area of the first negative active material layer is greater than that of the second negative active material layer; and/or, an active material capacity per unit area of the first positive active material layer is less than that of the second positive active material layer.

On the sixth aspect, the embodiments of the present application provide a manufacturing method of an electrode assembly, including: a providing device configured to provide a positive plate and a negative plate; an assembling device configured to stack the positive plate and the negative plate and wind the positive plate and the negative plate around a winding axis to form a winding structure, so that the electrode assembly includes an abutting region configured to abut against a housing and a non-abutting region not abutting against the housing at two sides of a thickness central surface of the electrode assembly, and the thickness central surface is perpendicular to a thickness direction of the electrode assembly and passes through the winding axis; where the negative plate includes a plurality of first negative active material layers located in the abutting region and stacked along the thickness direction, and a plurality of second negative active material layers located in the non-abutting region and stacked along the thickness direction; the positive plate includes a plurality of first positive active material layers located in the abutting region and stacked along the thickness direction, and a plurality of second positive active material layers located in the non-abutting region and stacked along the thickness direction; an active material capacity per unit area of the first negative active material layer is greater than that of the second negative active material layer; and/or, an active material capacity per unit area of the first positive active material layer is less than that of the second positive active material layer.

BRIEF DESCRIPTION OF THE DRAWINGS

To clearly explain the technical solutions in the embodiments of the present application, a brief introduction about drawings used in the embodiments of the present application will be given below. It should be understood that, the drawings below merely show some embodiments of the present application, which thus cannot be deemed as making limitations to the protection scope. Moreover, those of ordinary skill in the art may obtain other relative drawings based on these drawings without paying any creative effort.

Figure 1:
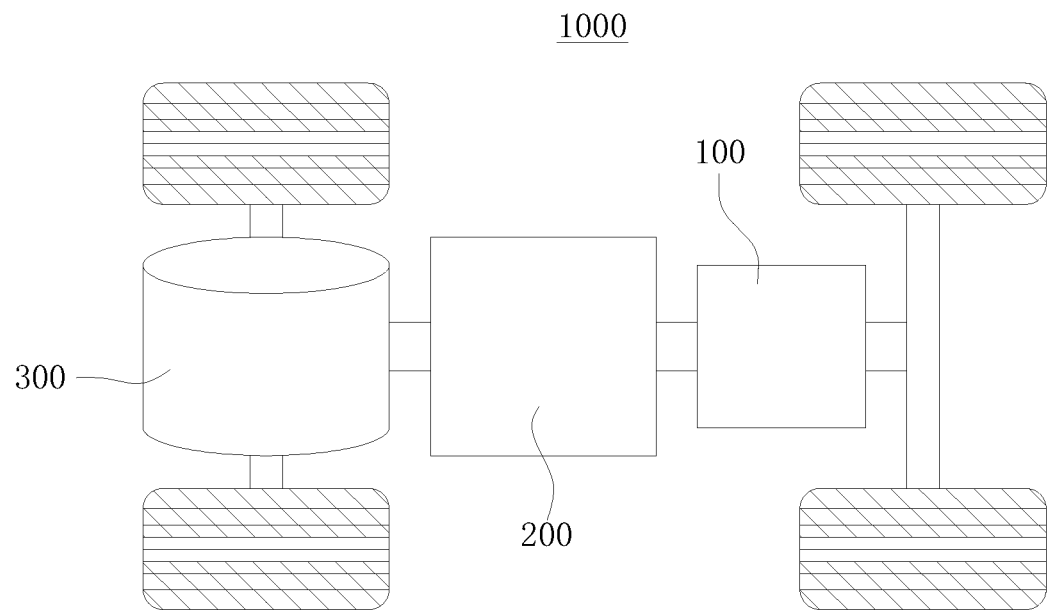
FIG. 1 is a schematically structural diagram of a vehicle provided by some embodiments of the present application.

The reference numerals denote that: 1000 vehicle; 100 battery; 10 box body; 11 first box body portion; 12 second box body portion; 20 battery cell; 21 housing; 211 side wall; 22 end cover component; 23 electrode assembly; 231 negative plate; 2311 negative current collector; 2312 first negative active material layer; 2312a first negative active section; 2312b second negative active section; 2312c third negative active section; 2312d fourth negative active section; 2312e fifth negative active section; 2312f sixth negative active section; 2312g seventh negative active section; 2312h central negative active section; 2312i first peripheral negative active section; 2312j second peripheral negative active section; 2312k third peripheral negative active section; 2312m inner negative active material layer; 2312n outer negative active material layer; 2313 second negative active material layer; 232 positive plate; 2321 positive current collector; 2322 first positive active material layer; 2322a first positive active section; 2322b second positive active section; 2322c third positive active section; 2322d fourth positive active section; 2322e fifth positive active section; 2322f sixth positive active section; 2322g seventh positive active section; 2322h central positive active section; 2322i first peripheral positive active section; 2322j second peripheral positive active section; 2322k third peripheral positive active section; 2322m inner positive active material layer; 2322n outer positive active material layer; 2323 second positive active material layer; 233 separator; X thickness direction; Y winding direction; Z winding axis direction; A0 flat area; A1 bend area; B thickness central surface; B1 abutting region; B2 non-abutting region; O1 center of a first negative active material layer; O2 central surface of the first negative active material layer; O3 center of the first positive active material layer; O4 central surface of the first positive active material layer; 200 controller; 300 motor; 400 manufacturing device of the electrode assembly; 410 providing device; 420 assembling device.

DETAILED DESCRIPTION OF THE EMBODIMENTS

The technical solutions of the present application will be further described in detail in the following embodiment by referring to the appended drawings. The detailed description and drawings in the following embodiments are merely used for illustratively explaining the principle of the present application, rather than limiting the scope of the present application, that is, the present application is not limited by the described embodiments below.

In the description of the present application, it should be noted that, unless otherwise stated, the term "a plurality of" means more than two; all directional or positional relationships indicated by the terms including "upper", "lower", "left", "right", "inside", "outside", and the like are merely for the purpose of conveniently and simply describing the present application, instead of indicating or hinting the device or component referred to can have the particular orientation or be structured and operated at the particular orientation, and thus cannot be read to limitations to the present application. Besides, the terms "first", "second", "third" and the like are merely for descriptive purpose, and thus cannot be understood as indicating or hinting relative importance. The term "perpendicular" has an error allowable range instead of being perpendicular in a strict sense. The term "parallel" has an error allowable range instead of being parallel in a strict sense.

The nouns of locality mentioned below refer to the directions shown in the drawings, rather than limitations to the specific structure of the present application. In the description of the present application, unless otherwise clearly stipulated, the terms "mount", "link", "connect" and the like should be understood in a broad sense, e.g., fixed connection, detachable connection or integral connection; or direct connection, or indirect connection via a medium. For those of ordinary skill in the art, its particular meanings can be understood depending on the particular contexts.

The term "a plurality of" in the present application means more than two (including two).

In the present application, the battery cell may include a lithium ion secondary battery, a lithium ion primary battery, a lithium-sulfur battery, a sodium lithium-ion battery, a sodium ion battery or magnesium ion battery or the like, which is not limited in the embodiments of the present application. The battery cell may be in a form of a cylinder, a flat body, a cuboid, or any of other shapes, which is not limited in the embodiments of the present application. The battery cell is generally divided into three types according to the way of packaging: cylindrical battery cells, square battery cells and flexible package battery cells, which is not limited by the embodiments of the present application.

The battery mentioned in the embodiments of the present application means a single physical module including one or a plurality of battery cells to provide a higher voltage and capacity. For example, the battery mentioned in the present application may include a battery module or a battery pack, etc. A battery generally includes a box body for encapsulating one or a plurality of battery cells. The box body can prevent charging or discharging of the battery cell from being affected by liquid or other foreign matters.

The battery cell includes an electrode assembly and an electrolyte. The electrode assembly consists of a positive plate, a negative plate and a separator. The battery cell works mainly depending on movement of metal ions between the positive and negative plates. The positive plate includes a positive current collector and a positive active material layer. The positive active material layer is coated on the surface of the positive current collector, and the current collector uncoated with a positive active material layer protrudes from the positive current collector coated with a positive active material layer. The positive current collector uncoated with a positive active material layer could be considered as a positive electrode tab. By taking a lithium-ion battery as an example, the positive current collector may be made of aluminum, and the positive active material can be lithium cobaltate, lithium iron phosphate, ternary lithium or lithium manganate, etc. The negative plate includes a negative current collector and a negative active material layer. The negative active material layer is coated on the surface of the negative current collector. The negative current collector uncoated with the negative active material layer protrudes from the current collector coated with the negative active material layer. The negative current collector uncoated with the negative active material layer could be considered as a negative electrode lug. The negative current collector may be made of copper, and the negative active material can be carbon, silicon or the like. In order to ensure passing through of a high current without fusing, a plurality of positive electrode lugs are provided and stacked up, and a plurality of negative electrode lugs are provided and stacked up. The separator may be made of PP (polypropylene), PE (polyethylene, polyethylene) or the like. In addition, the electrode assembly may be either winding-type or laminated-type, which is not limited by the embodiments of the present application.

Many design factors should be considered in the development of the battery technology, such as energy density, cycle life, discharge capacity, charge-discharge ratio etcetera, and in addition, safety of the battery also needs to be taken into account. Lithium plating is one of major factors having an effect on the electric property and safety property of a battery, once lithium plating happens, the electric property of the battery is reduced, dendrites are easily formed as a result of accumulation of a lithium plating amount, and the dendrites may piece through a separator to cause short circuit in the battery and further cause potential safety hazard. There are various reasons to cause lithium plating.

The inventor finds that, in the battery cell including a plurality of electrode assemblies arranged side by side along the thickness direction, when thermal expansion takes places in two electrode assemblies at two ends in the thickness direction, one side abut against an inner wall of the housing of the battery cell, and under the restriction of the inner wall of the housing, stress at one side of the electrode assemblies abutting against the housing is failed to release, therefore, the possibility of extruding electrotype from the side that electrode abut the housing is higher than that from one side of the electrode assemblies that do not abut against the housing, the problem of insufficient infiltration of the electrotype would occur at the side that with higher extruding electrotype level, in such a case, gaps of the negative plates become small and diffusion resistance of lithium ions in the negative plates is increased, thereby causing lithium plating.

In view of the above, the embodiments of the present application provide a technical solution in which in an electrode assembly, by enabling an active material capacity per unit area of a first negative active material layer of an abutting region used for abutting against a housing to be greater than that of a second negative active material layer of the non-abutting region not abutting against the housing, and/or, by enabling an active material capacity per unit area of a first positive active material layer of an abutting region used for abutting against the housing to be less than that of a second positive active material layer of the non-abutting region not abutting against the housing, the risk of lithium plating due to extrusion of an electrolyte when the abutting region abuts against the housing can be effectively reduced.

The technical solutions described in the embodiments of the present application are applicable to batteries and electric apparatuses using the batteries.

The electric apparatus can be vehicles, mobile phones, portable devices, laptops, ships, spacecraft, electric toys, electric tools and so on. The vehicles may refer to an oil-fueled vehicle, a gas vehicle or a new energy vehicle. The new energy vehicle may be a pure electric vehicle, a hybrid vehicle or an extended-range vehicle, etc. A spacecraft may include an aircraft, a rocket, a space shuttle, a spaceship, and so on; electric toys include fixed or mobile electric toys, for example, game machines, electric car toys, electric ship toys, electric aircraft toys, etc. Electric tools include electric metal cutting tools, electric grinding tools, electric assembling tools, and electric tools for railways, for example, electric drills, electric grinding wheel machines, electric wrenches, electric screwdrivers, electric hammers, impact electric drills, concrete vibrators, electric planers, etc. The embodiments of the present application do not make special restrictions on the above-mentioned electric apparatus.

For the purpose of easy explanations of the following embodiments, the vehicle 1000 as the electric apparatus will be taken as an example for description.

Please refer to FIG. 1, it shows a schematically structural diagram of the vehicle 1000 provided by some embodiments of the present application. The inner part of the vehicle 1000 is provided with a battery 100. The battery 100 can be disposed at the bottom, head or tail of the vehicle 1000. The battery 100 supplies power to the vehicle 1000, for example, the battery 100 can serve as an operational power supply of the vehicle 1000. The vehicle 1000 further includes a controller 200 and a motor 300. The controller 200 is used for controlling the battery 100 to supply power for the motor 300 to meet requirements on electricity for example in start, navigation or driving of the vehicle 1000.

In some embodiments of the present application, the battery 100 can serve as not only an operational power supply of the vehicle 1000, but also a drive power supply of the vehicle 1000, thereby substituting or partially substituting fuel oil or natural gas to supply power for the vehicle 1000.

Figure 2:
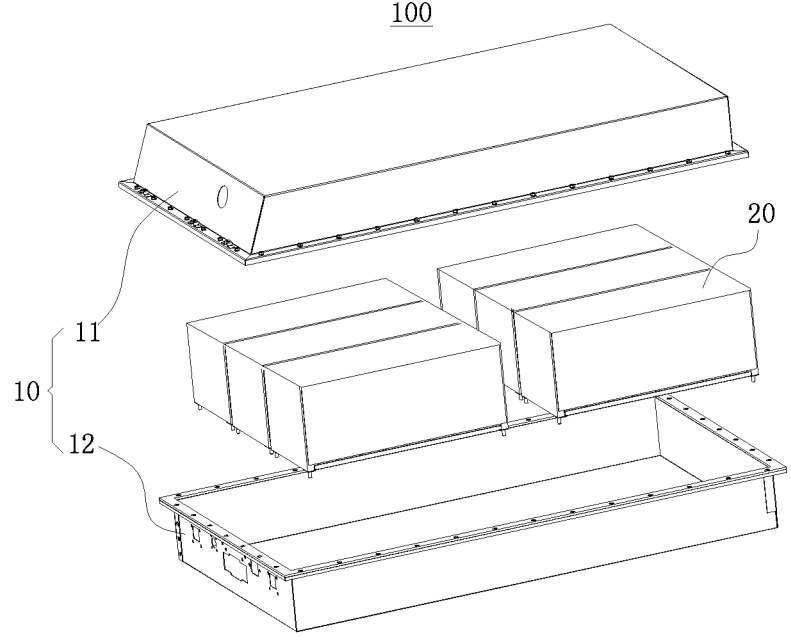
FIG. 2 is a schematically structural diagram of a battery provided by some embodiments of the present application.

As shown in FIG. 2, the battery 100 includes a box body 10 and a battery cell 20. The battery cell 20 is accommodated in the box body 10. The box body 10 provides an accommodating space for the battery cell 20. The box body 10 includes a first box body portion 11 and a second box body portion 12. The first box body portion 11 and the second box body portion 12 are configured to jointly define an accommodating space for accommodating the battery cell 20. In the battery 100, there may be one or a plurality of battery cells 20. If there are a plurality of battery cells 20, the plurality of battery cells 20 are in series, parallel or parallel-series connection. The parallel-series connection means the plurality of battery cells 20 adopt both serial connection and parallel connection. The plurality of battery cells 20 can be in directly series, parallel or parallel-series connection into a whole, and then the whole formed by the plurality of battery cells 20 is accommodated in the box body 10. Besides, the plurality of battery cells 20 also can be in series, parallel or parallel-series connection first to form a plurality of battery modules, and then the plurality of battery modules are in series, parallel or parallel-series connection to form a whole to be accommodated in the box body 10. The battery cell 20 may be of a cylinder, a flat body or other shapes.

In some embodiments, the battery 100 further includes influx components (not shown in the drawings). By means of the influx components, a plurality of battery cells 20 are electrically connected to achieve series, parallel or parallel-series connection of the plurality of battery cells 20.

Figure 3:
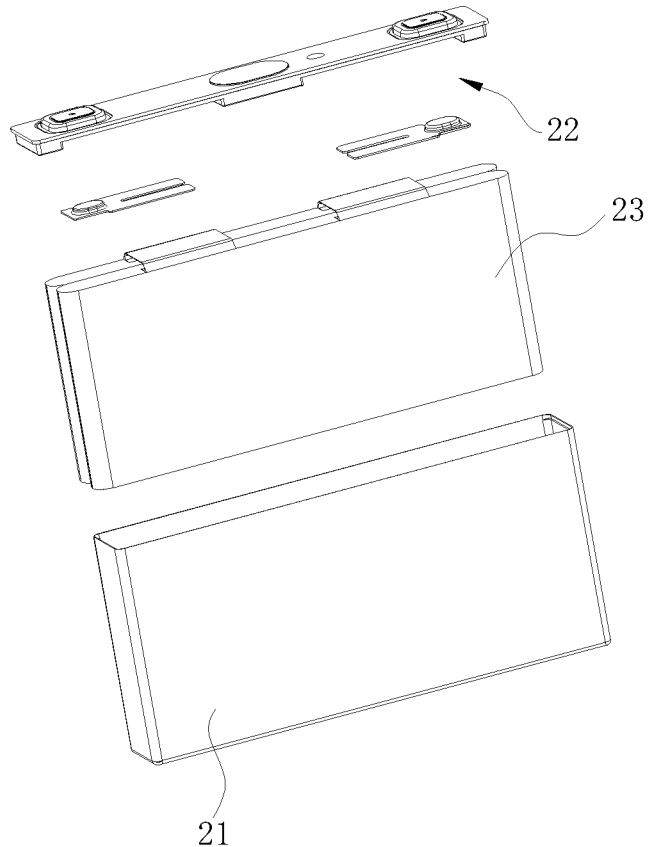
FIG. 3 is an exploded view of a battery cell provided by some embodiments of the present application.
Figure 4:
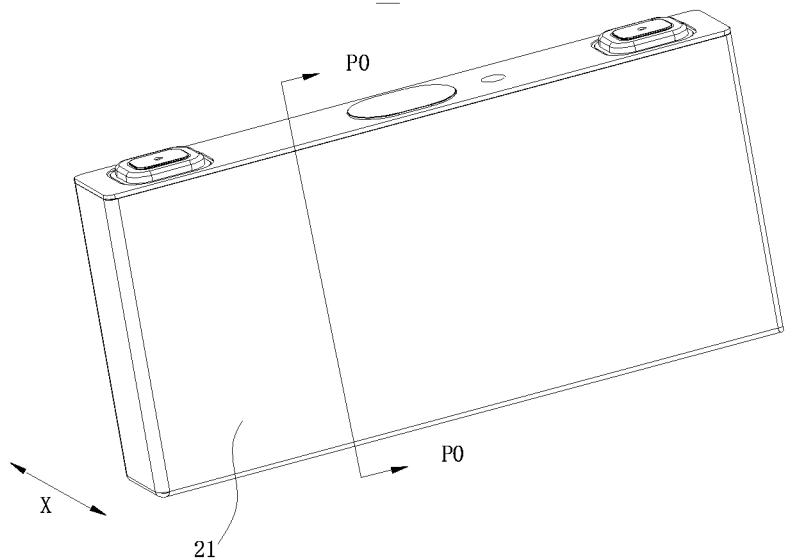
FIG. 4 is a schematically structural diagram of an assembled battery cell provided by some embodiments of the present application.

Please refer to FIGS. 3 and 4, FIG. 3 is an exploded view of the battery cell 20 provided by some embodiments of the present application, and FIG. 4 is a schematically structural diagram of an assembled battery cell 20. The battery cell 20 includes a housing 21, an end cover component 22 and an electrode assembly 23. The housing 21 has an opening. The electrode assembly 23 is accommodated into the housing. The end cover assembly 22 is used for covering the opening. The housing 21 is varied in shape, for example, the housing may be of a cylinder, a flat body or other shapes. The shape of the housing is dependent upon the specific shape of the electrode assembly 23. For example, the electrode assembly 23 is a flat structure, and the housing may be of a cuboid structure. The housing is varied in material, for example, the housing is made of cooper, iron, aluminum, stainless steel, aluminum alloy or the like, which is not limited in the embodiments of the present application.

There are a plurality of electrode assemblies 23 in the battery cell 20. FIG. 3 and FIG. 4 illustratively show the battery cell 20 of which the housing is a cuboid and two electrode assemblies 23 are flat. In FIG. 3, two electrode assemblies 23 are arranged side by side along the thickness direction X of the electrode assemblies 23.

Figure 5:
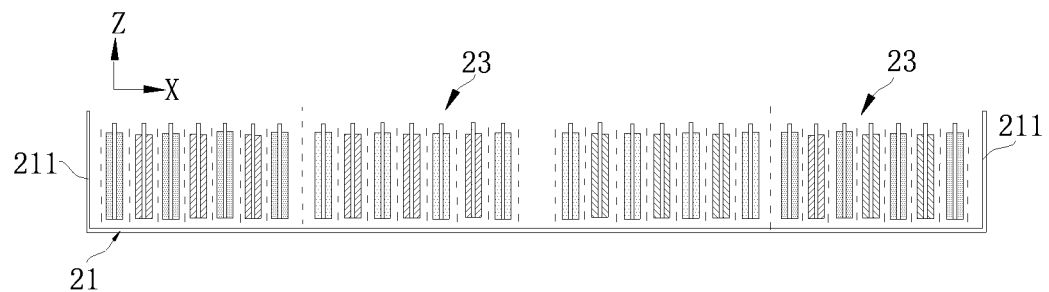
FIG. 5 is a P0-P0-directional cutaway view in FIG. 4.

As shown in FIG. 5, the housing 21 has two opposite side walls 211 along the thickness direction X of the electrode assembly 23. One electrode assembly 23 of the two electrode assemblies 23 is closer to one side wall 211, while the other electrode assembly 23 is closer to the other side wall 211.

In some embodiments, the battery cell 20 also includes at least one cell arranged along the thickness direction X. The at least one cell is disposed between the two electrode assemblies 23. The structure of the cell may be same with that of the electrode assembly 23 provided by the embodiments of the present application or be designed by referring to the existing cell, which is not repeated hereto.

Figure 6:
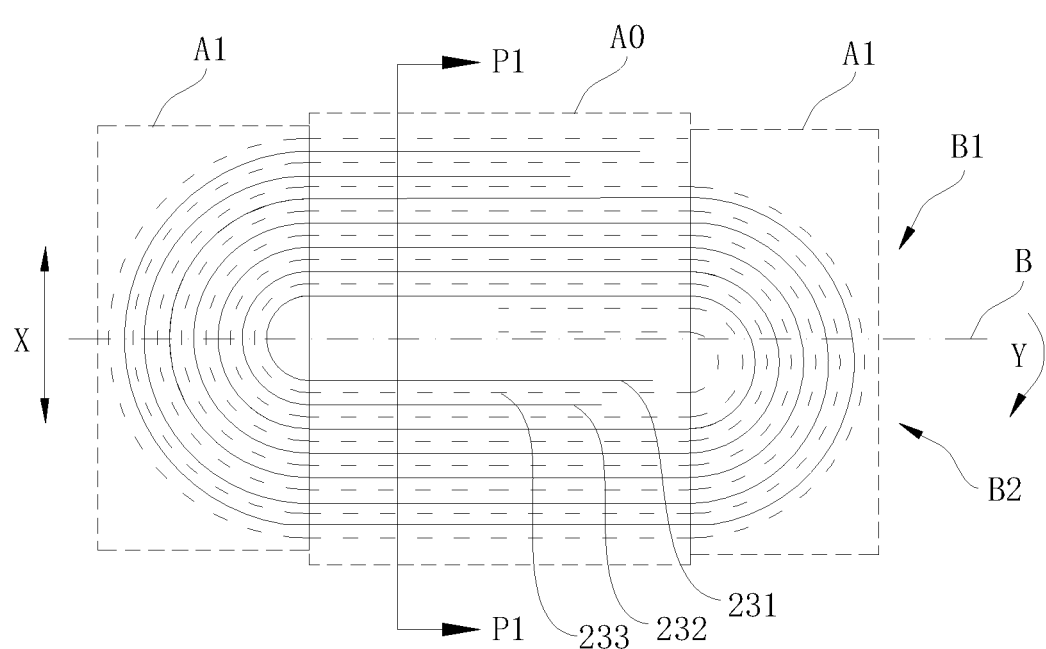
FIG. 6 is a schematically structural diagram of an electrode assembly provided by some embodiments of the present application.
Figure 7:
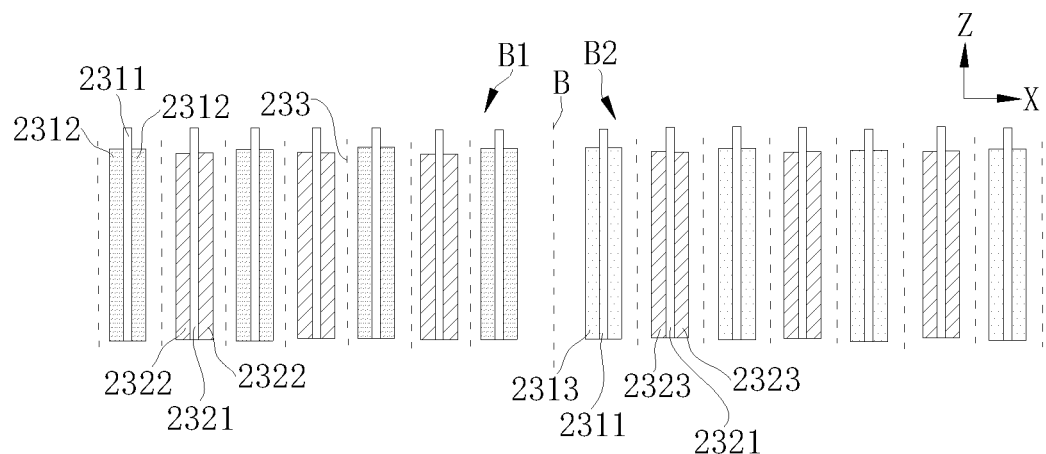
FIG. 7 is a P1-P1-directional cutaway view in FIG. 6.

In some embodiments, as shown in FIGS. 6 and 7, the electrode assembly 23 includes a negative plate 231, a positive plate 232 and a separator 233. The positive plate 232, the negative plate 231 and the separator 233 are stacked and winded around a winding axis to form a winding electrode assembly 23.

The negative plate 231 includes a negative current collector 2311, a first negative active material layer 2312 coated on two surfaces of the negative current collector 2311 and a second negative active material layer 2313 coated on two surfaces of the negative current electrode 2311. A plurality of first negative active material layers 2312 and a plurality of second negative active material layers 2313 are provided. The first negative active material layers 2312 and the second negative active material layers 2313 are alternatively distributed along the winding direction Y of the electrode assembly 23.

The positive plate 232 includes a positive current collector 2321, a first positive active material layer 2322 coated on two surfaces of the positive current collector 2321 and a second positive active material layer 2323 coated on two surfaces of the positive current electrode 2321. A plurality of first positive active material layers 2322 and a plurality of second positive active material layers 2323 are provided. The first positive active material layers 2322 and the second positive active material layers 2323 are alternatively distributed along the winding direction Y of the electrode assembly 23.

The separator 233 is used for separating the negative plate 231 from the positive plate 232 to prevent short circuit. The separator 233 is provided with a massive amount of through microspores to ensure that electrolyte ions can freely pass through, and have good penetrability for lithium ions. The separator 233 is made of PP, PE or the like.

The electrode assembly 23 includes a flat area AO and two bend areas A1. The two bend areas A1 are connected to two ends of the flat area AO, respectively. The first negative active material layer 2312, the first positive active material layer 2322, the second negative active material layer 2313 and the second positive active material layer 2323 are all located in the flat area AO, and stacked in the flat area AO along the thickness direction X.

The electrode assembly 23 includes an abutting region B1 used for abutting against the housing 21 (shown in FIG. 5) and a non-abutting region B2 not abutting against the housing 21 (shown in FIG. 5) at two sides of a thickness central surface B thereof, and the thickness central surface B is perpendicular to a thickness direction X of the electrode assembly 23 and passes through the winding axis. All the first negative active material layers 2312 and all the first positive active material layers 2322 are located in the abutting region B1 and stacked along the thickness direction X. All the second negative active material layers 2313 and all the second positive active material layers 2323 are located in the non-abutting region B2 and stacked along the thickness direction X.

Understandably, two portions of the flat area AO at two sides of the thickness central surface B of the electrode assembly 23 are located in the abutting region B1 and the non-abutting region B2, respectively.

In some embodiments, along the thickness direction X, active material capacities per unit area of the first negative active material layers 2312 on two surfaces of the negative current collector 2311 on arbitrary one layer are same, and the active material capacities per unit area of the first negative active material layers 2312 can represent the active material capacities per unit area of the first negative active material layers 2312 on two surfaces of the negative current collector 2311 on a corresponding layer. active material capacities per unit area of the second negative active material layers 2313 on two surfaces of the negative current collector 2311 on arbitrary one layer are same, and the active material capacities per unit area of the second negative active material layers 2313 can represent the active material capacities per unit area of the second negative active material layers 2313 on two surfaces of the negative current collector 2311 on a corresponding layer.

In some embodiments, please continue to refer to FIG. 7, the active material capacity per unit area of the first negative active material layer 2312 is greater than that of the second negative active material layer 2313.

When an active material capacity per unit area of the second negative active material layer 2313 of the non-abutting region B2 not abutting against the housing 21 meets a design requirement, i.e., when the active material capacity per unit area of the second negative active material layer 2313 of the non-abutting region B2 meets a first preset value, lithium plating has difficulty taking place in the second negative active material layer 2313 of the non-abutting region B2. When the active material capacity per unit area of the first negative active material layer 2312 of the abutting region B1 is greater than that of the second negative active material layer 2313 of the non-abutting region B2, i.e., when the active material capacity per unit area of the first negative active material layer 2312 is greater than a first preset value, it corresponds to increasing the active material capacity per unit area of the first negative active material layer 2312, the first negative active material layer 2312 can receive lithium ions de-intercalating from the first positive active material layer 2322, and the possibility of lithium plating in the first negative active material layer 2312 of the abutting region B1 is low. Therefore, the risk of lithium plating due to extrusion of an electrolyte when the abutting region B1 abuts against the housing 21 can be effectively reduced.

It should be explained that, the active material capacity per unit area of the first negative active material layer 2312 refers to a ratio of an active material capacity of the first negative active material layer 2312 to a total area of the first negative active material layer 2312, and the active material capacity per unit area of the second negative active material layer 2313 refers to a ratio of an active material capacity of the second negative active material layer 2313 to a total area of the second negative active material layer 2313. It should be further explained that, the active material capacity of the first negative active material layer 2312 is Q1, and the area of the first negative active material layer 2312 is S1, so that the active material capacity per unit area QS1 of the first negative active material layer 2312 equals to Q1/S1. The active material capacity of the second negative active material layer 2313 is Q2, and the area of the second negative active material layer 2313 is S2, so that the active material capacity per unit area QS2 of the second negative active material layer 2313 equals to Q2/S2.

There are many factors capable of influencing the active material capacity per unit area of the first negative active material layer 2312 and the active material capacity per unit area of the second negative active material layer 2313. Therefore, there are many ways to achieve that the active material capacity per unit area of the first negative active material layer 2312 is greater than that of the second negative active material layer 2313.

In some embodiments, a capacity per gram of an active material of the first negative active material layer 2312 is greater than that of an active material of the second negative active material layer 2313.

By increasing the capacity per gram of the active material of the first negative active material layer 2312 of the abutting region B1, the active material capacity per unit area of the first negative active material layer 2312 of the abutting region B1 is increased, so that the active material capacity per unit area of the first negative active material layer 2312 of the abutting region B1 is greater than that of the second negative active material layer 2313 of the non-abutting region B2. Therefore, the risk of lithium plating due to extrusion of an electrolyte when the abutting region B1 abuts against the housing 21 is effectively reduced.

The capacity per gram refers to a ratio of an electric capacity released by an active material in the battery 100 to a mass of the active material. The capacity per gram is related to the active material in the first negative active material layer 2312 and the active material in the second negative active material layer 2313. For example, the active material in the first negative active material layer 2312 is a compound of silicon, and the active material in the second negative active material layer 2313 is graphite. The compound of silicon has a material activity better than that of the graphite, so that lithium intercalation ability of the first negative active material layer 2312 is better than that of the second negative active material layer 2313 to reduce the influence from extrusion of an electrolyte to the abutting region B1.

In another some embodiments, a ratio of a weight of an active material of the first negative active material layer 2312 to a weight of the first negative active material layer 2312 is greater than a ratio of a weight of an active material of the second negative active material layer 2313 to a weight of the second negative active material layer 2313, so that the active material capacity per unit area of the first negative active material layer 2312 is greater than that of the second negative active material layer 2313.

Both the first negative active material layer 2312 and the second negative active material layer 2313 include an active material, a binder and a conductive agent, respectively. By increasing the active material in the first negative active material layer 2312, the proportion of the active material in the first negative active material layer 2312 is increased so as to increase the active material capacity per unit area of the first negative active material layer 2312, so that the active material capacity per unit area of the first negative active material layer 2312 is greater than that of the second negative active material layer 2313.

In some embodiments, it may reduce the weights of the binder and conductive agent in the first negative active material layer 2312 so as to lower the weight of the first negative active material layer 2312 but improve the proportion of the active material in the first negative active material layer 2312, which corresponds to reducing the coating weight of the first negative active material layer 2312, thereby not only enabling the ratio of a weight of an active material of the first negative active material layer 2312 to a weight of the first negative active material layer 2312 to be greater than the ratio of a weight of an active material of the second negative active material layer 2313 to a weight of the second negative active material layer 2313, but also lowering the requirement of the first negative active material layer 2312 on an electrolyte. Infiltration of the first negative active material layer 2312 can be realized by means of a little of electrolyte, and influence to the first negative active material layer 2312 from extrusion of the electrolyte is lowered.

In the abutting region B1, along the thickness direction X, the closer a position approaches the housing 21 (shown in FIG. 5), the more seriously it is extruded with the housing 21.

Figure 8:
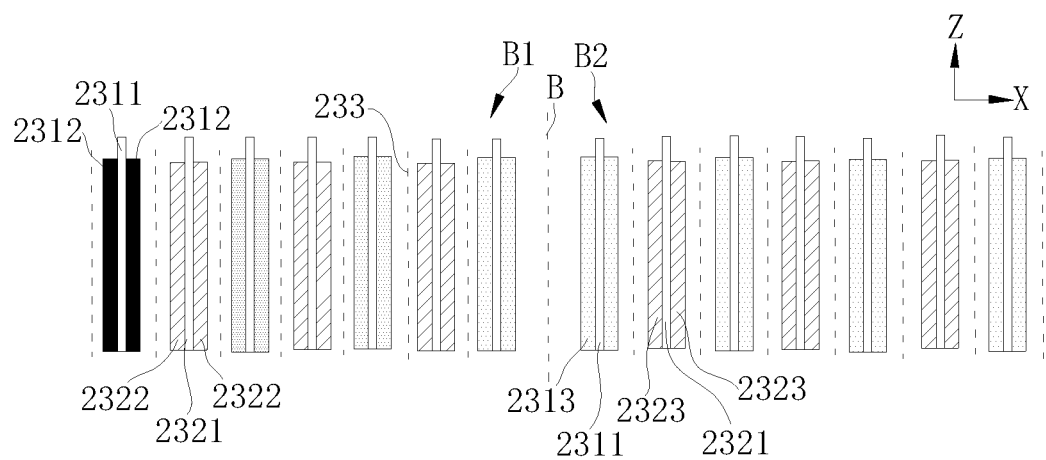
FIG. 8 is a schematically structural diagram of the electrode assembly provided by another some embodiments of the present application.

Based on this, as shown in FIG. 8, in some embodiments, along the thickness direction X, an active material capacity per unit area of one first negative active material layer 2312 of two adjacent first negative active material layers 2312 is greater than that of the other first negative active material layer 2312, and the other first negative active material layer 2312 is closer to the thickness central surface B than the one first negative active material layer 2312. Understandably, in the abutting region B1, along the thickness direction X, the further the first negative active material layer 2312 is away from the thickness central surface B (closer to the side wall 211 of the housing 21), the greater its active material capacity per unit area is, so that the risk of lithium plating due to extrusion of an electrolyte when the abutting region B1 abuts against the housing 21 can be effectively reduced.

Likewise, more ways can be used to achieve that an active material capacity per unit area of one first negative active material layer 2312 of two adjacent first negative active material layers 2312 closer to a side wall 211 of the housing 21 is greater than that of the other first negative active material layer 2312.

In some embodiments, a capacity per gram of an active material of one first negative active material layer 2312 of two adjacent first negative active material layers 2312 is greater than that of an active material of the other first negative active material layer 2312, and the other first negative active material layer 2312 is closer to the thickness central surface B than the one first negative active material layer 2312. Understandably, in the abutting region B1, along the thickness direction X, the further the first negative active material layer 2312 is away from the thickness central surface B (closer to the side wall 211 of the housing 21), the greater its capacity per gram is.

The capacity per gram is related to the active material in the first negative active material layer 2312. For example, the active material in one first negative active material layer 2312 of two adjacent first negative active material layers 2312 closer to the side wall 211 of the housing 21 is a compound of silicon, and the active material in the other first negative active material layer 2312 is graphite. The compound of silicon has a material activity better than that of the graphite, so that lithium intercalation ability of the first negative active material layer 2312 of two adjacent first negative active material layers 2312 closer to the side wall 211 of the housing 21 is better than that of the other first negative active material layer 2312 to further reduce the influence from extrusion of an electrolyte to the abutting region B1.

In some embodiments, a ratio of a weight of an active material of one first negative active material layer 2312 of two adjacent first negative active material layers 2312 to a weight of the one first negative active material layer 2312 is greater than a ratio of a weight of an active material of the other first negative active material layer 2312 to a weight of the other first negative active material layer 2312, and the other first negative active material layer 2312 is closer to the thickness central surface B than the one first negative active material layer 2312. Understandably, in the abutting region B1, along the thickness direction X, the further the first negative active material layer 2312 is away from the thickness central surface B (closer to the side wall 211 of the housing 21), the greater its ratio of a weight of an active material of the first negative active material layer 2312 to a weight of the first negative active material layer 2312 is.

In some embodiments, by increasing the active material in the first negative active material layer 2312 of two adjacent first negative active material layers 2312 closer to the side wall 211 of the housing 21, a proportion of the active material in the first negative active material layer 2312 is improved, thereby increasing the active material capacity per unit area of the first negative active material layer 2312 so that the active material capacity per unit area of the first negative active material layer 2312 closer to the housing 21 is greater than that of the other first negative active material layer 2312.

In some embodiments, it may reduce the weights of the binder and conductive agent in the first negative active material layer 2312 closer to the housing 21 so as to lower the weight of the first negative active material layer 2312 closer to the housing 21 but improve the proportion of the active material in the first negative active material layer 2312, which corresponds to reducing the coating weight of the first negative active material layer 2312 of two adjacent first negative active material layers 2312 closer to the housing 21, thereby not only enabling the ratio of a weight of an active material of the first negative active material layer 2312 to a weight of the first negative active material layer 2312 to be greater than the ratio of a weight of an active material of the second negative active material layer 2313 to a weight of the second negative active material layer 2313, but also reducing the requirement of the first negative active material layer 2312 closer to the housing 21 on an electrolyte. Infiltration of the first negative active material layer 2312 can be realized by means of a little of electrolyte, and influence to the first negative active material layer 2312 from extrusion of the electrolyte is lowered.

With regard to each first negative active material layer 2312, when the electrode assembly 23 expands, the closer a position approaches a center O1 of the first negative active material layer, the greater the extrusion force it bears, and the higher the possibility that the electrolyte is extruded becomes.

Figure 9:
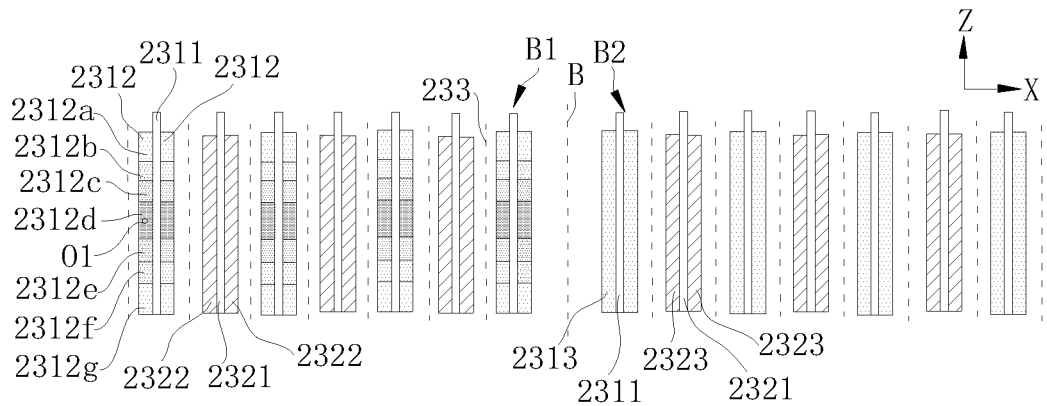
FIG. 9 is a schematically structural diagram of the electrode assembly provided by yet some embodiments of the present application (a first negative active material layer includes a plurality of negative active sections)

Based on this, in some embodiments, as shown in FIG. 9, the first negative active material layer 2312 includes a plurality of negative active sections, an active material capacity per unit area of one negative active section of two adjacent negative active sections is greater than that of the other negative active section, and the one negative active section is closer to a center O1 of the first negative active material layer than the other negative active section. Understandably, in the abutting region B1, a closer distance of the negative active section to the center O1 of the first negative active material layer produces a greater active material capacity per unit area. By dividing the first negative active material layer 2312 into a plurality of negative active sections, and rendering that the closer the negative active section approaches the center O1 of the first negative active material layer, the greater its active material capacity per unit area is, the position closer to the center O1 of the first negative active material layer is less influenced by extrusion of the electrotype, and the risk of lithium plating due to extrusion of an electrolyte when the abutting region B1 abuts against the housing 21 can be effectively reduced.

In some embodiments, a capacity per gram of an active material of one negative active section of two adjacent negative active sections is greater than that of an active material of the other negative active section, and the one negative active section is closer to the center O1 of the first negative active material layer than the other negative active section, so that the closer first negative active material layer 2312 has an active material capacity per unit area greater than that of the other first negative active material layer 2312.

In some embodiments, a ratio of a weight of an active material of one negative active section of two adjacent negative active sections to a weight of the one negative active section is greater than a ratio of a weight of an active material of the other negative active section to a weight of the other negative active section, and the one negative active section is closer to the center O1 of the first negative active material layer than the other negative active section.

In some embodiments, by increasing the active material in one negative active section of two adjacent negative active sections closer to the housing 21, a proportion of the active material in the negative active section is improved, thereby increasing the active material capacity per unit area of the negative active section so that the active material capacity per unit area of the negative active section closer to the center O1 of the first negative active material layer is greater than that of the other negative active section.

In some embodiments, it may reduce the weights of the binder and conductive agent in the negative active section closer to the center of the first negative active material layer 2312 so as to lower the weight of the negative active section but improve the proportion of the active material in the first negative active material layer 2312, which corresponds to reducing the coating weight of one negative active section of two adjacent negative active sections closer to the center, thereby not only enabling the ratio of a weight of an active material in the negative active section to a weight of the negative active section to be greater than a ratio of a weight of an active material in the other negative active section to a weight of the other negative active section, but also reducing the requirement of the negative active section closer to the center O1 of the first negative active material layer on an electrolyte. Infiltration of the negative active section can be realized by means of a little of electrolyte, and influence to the first negative active material layer 2312 from extrusion of the electrolyte is lowered.

The negative active section may be varied in shape, and each negative active section may have same or different shape(s).

Figure 10:
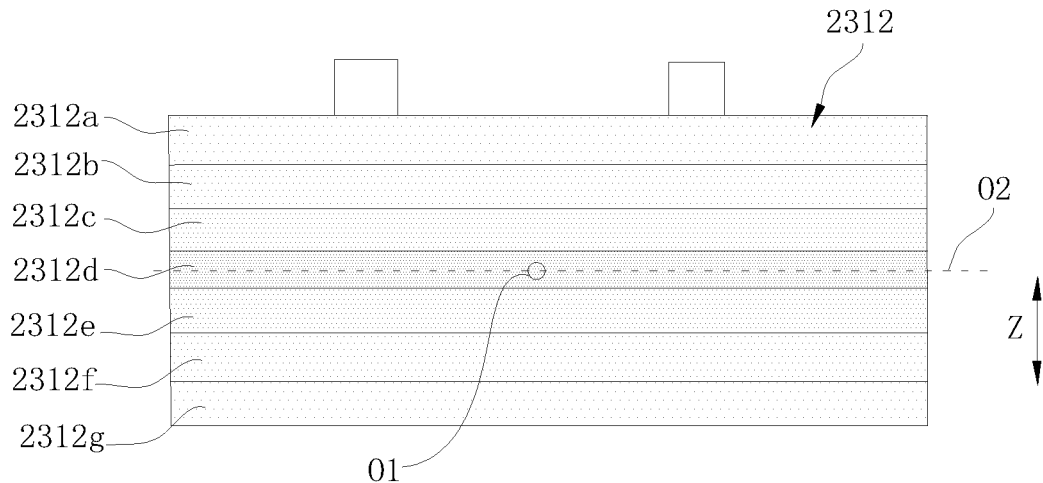
FIG. 10 is a schematically structural diagram of the first negative active material layer provided by some embodiments of the present application.
Figure 11:
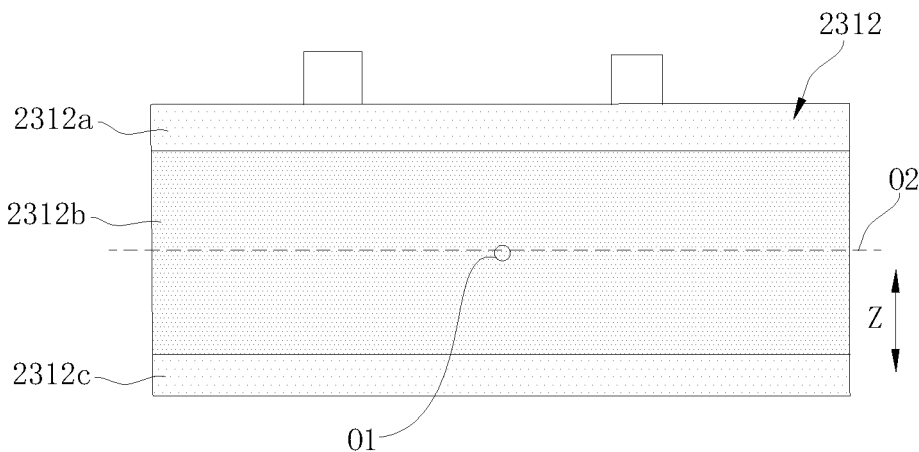
FIG. 11 is a schematically structural diagram of the first negative active material layer provided by yet some embodiments of the present application.

In some embodiments, as shown in FIGS. 10 and 11, each negative active section is a strip shape. The negative active sections are arrayed along the direction of a winding axis. The number of the negative active sections is odd.

As shown in FIG. 10, seven negative active sections are provided successively along the winding axis direction Z: a first negative active section 2312a, a second negative active section 2312b, a third negative active section 2312c, a fourth negative active section 2312d, a fifth negative active section 2312e, a sixth negative active section 2312f and a seventh negative active section 2312g. In the winding axis direction Z, a central surface of the fourth negative active section 2312d and a central surface O2 of the first negative active material layer coincide with each other and pass through the center O1 of the first negative active material layer, the first negative active section 2312a and the seventh negative active section 2312g are symmetric about the central surface O2 of the first negative active material layer, the second negative active section 2312b and the sixth negative active section 2312f are symmetric about the central surface O2 of the first negative active material layer, and the third negative active section 2312c and the fifth negative active section 2312e are symmetric about the central surface O2 of the first negative active material layer.

An active material capacity per unit area of the fourth negative active section 2312d is greater than that of the third negative active section 2312c, the active material capacity per unit area of the third negative active section 2312c is greater than that of the second negative active section 2312b, and the active material capacity per unit area of the second negative active section 2312b is greater than that of the first negative active section 2312a; the active material capacity per unit area of the fourth negative active section 2312d is greater than that of the fifth negative active section 2312e, the active material capacity per unit area of the fifth negative active section 2312e is greater than that of the sixth negative active section 2312f, and the active material capacity per unit area of the sixth negative active section 2312f is greater than that of the seventh negative active section 2312g.

In some embodiments, as shown in FIG. 11, three negative active sections are provided successively along the winding axis direction Z: a first negative active section 2312a, a second negative active section 2312b and a third negative active section 2312c. In the winding axis direction Z, a central surface of the second negative active section 2312b and the central surface O2 of the first negative active material layer coincide with each other and pass through the center O1 of the first negative active material layer, the first negative active section 2312a and the third negative active section 2312c are symmetric about the central surface O2 of the first negative active material layer.

The active material capacity per unit area of the second negative active section 2312b is greater than that of the first negative active section 2312a, and the active material capacity per unit area of the second negative active section 2312b is greater than that of the third negative active section 2312c.

The active material capacity per unit area of the first negative active section 2312a is as same as that of the third negative active section 2312c.

Symmetry means that two negative active sections symmetrical about the central surface O2 of the first negative active material layer are same in area and active material capacity per unit area.

When the negative active sections are of a strip shape and are arrayed along the winding axis direction Z, the distance of each negative active section to the center O1 of the first negative active material layer can be understood as a distance relative to the central surface O2 of the first negative active material layer.

Figure 12:
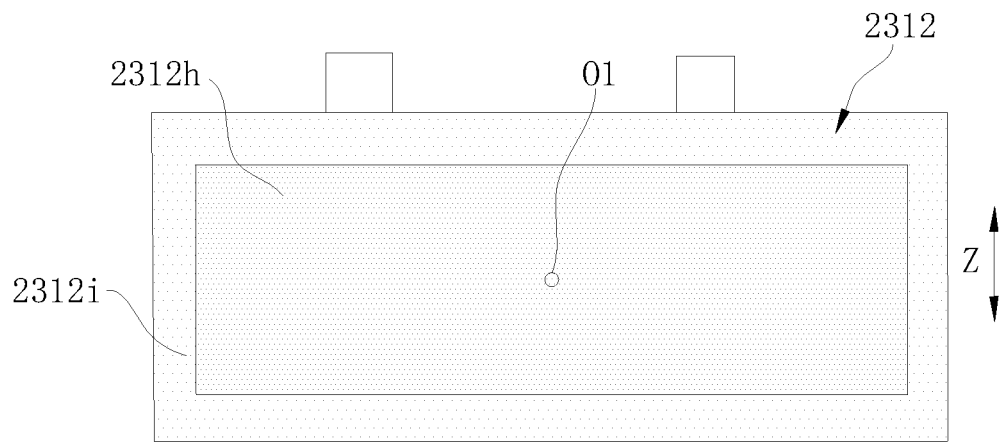
FIG. 12 is a schematically structural diagram of the first negative active material layer provided by another some embodiments of the present application.
Figure 13:
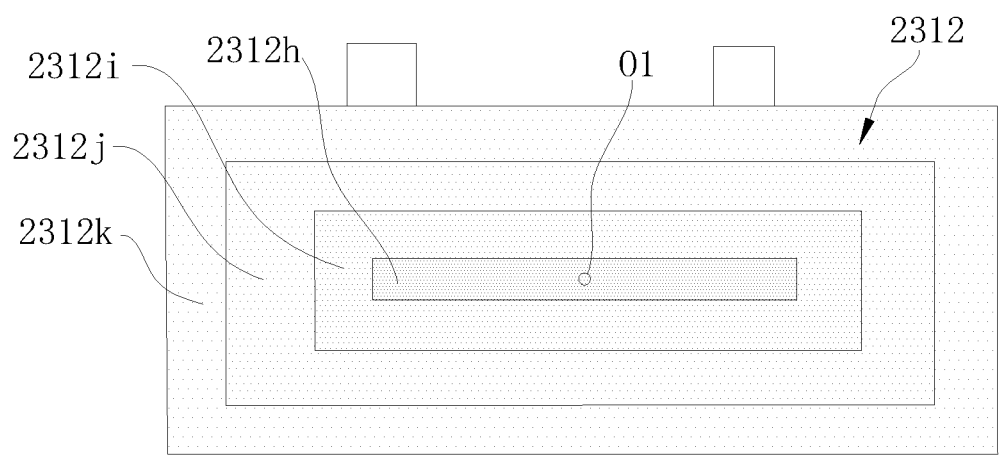
FIG. 13 is a schematically structural diagram of the first negative active material layer provided by further some embodiments of the present application.
Figure 14:
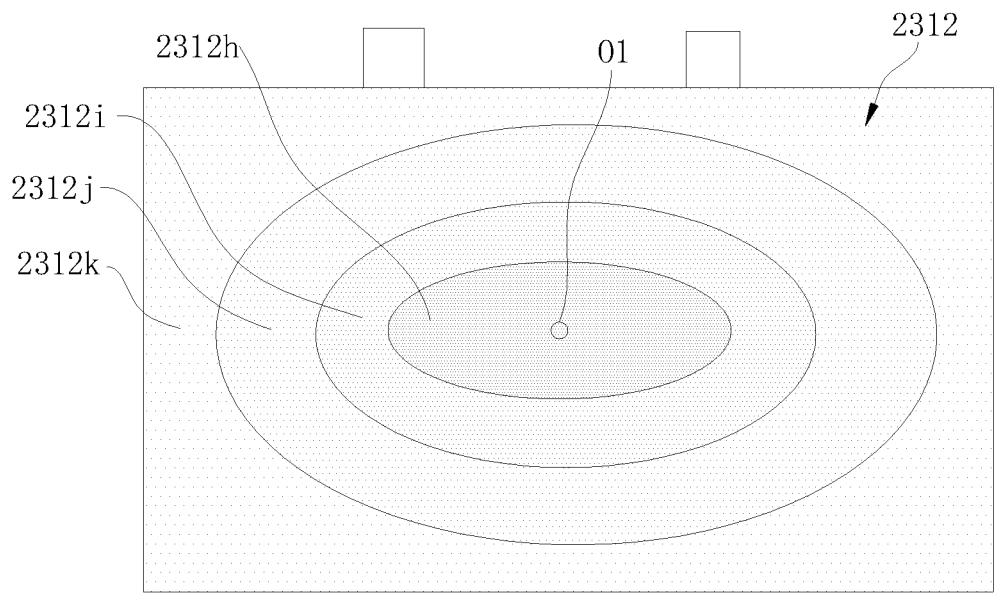
FIG. 14 is a schematically structural diagram of the first negative active material layer provided by further some embodiments of the present application (a central negative active section is an oval shape)

In some embodiments, as shown in FIGS. 12 to 14, the plurality of negative active sections include a central negative active section 2312h and at least one peripheral negative active section, each peripheral negative active section is annular and encircles the central negative active section 2312h, the central negative active section 2312h and the at least one peripheral negative active section are radially distributed around the center O1 of the first negative active material layer. Each negative active section encircles the center O1 of the first negative active material layer, and along arbitrary one direction, the active material capacity per unit area of one negative active section of two adjacent negative active sections closer to the center is greater than that of the other negative active section.

The active material capacity per unit area of the central negative active section 2312h is greater than that of the peripheral negative active section.

In some embodiments, as shown in FIG. 12, the central negative active section 2312h is rectangular, and one peripheral negative active section is provided and defined as a first peripheral negative active section 2312i. An inner contour of the peripheral negative active section is rectangular and coincides with an outer contour of the central negative active section 2312h, and an outer contour of the peripheral negative active section is rectangular. The center of the central negative active section 2312h is the center O1 of the first negative active material layer.

In some embodiments, as shown in FIG. 13, three peripheral negative active sections are provided: a first peripheral negative active section 2312i, a second peripheral negative active section 2312j and a third peripheral negative active section 2312k. The first peripheral negative active section 2312i encircles the central negative active section 2312h, and an inner contour of the first peripheral negative active section 2312i coincides with an outer contour of the central negative active section 2312h. The second peripheral negative active section 2312j encircles the first peripheral negative active section 2312i, and an inner contour of the second peripheral negative active section 2312j coincides with an outer contour of the first peripheral negative active section 2312i. The third peripheral negative active section 2312k encircles the second peripheral negative active section 2312j, and an inner contour of the third peripheral negative active section 2312k coincides with an outer contour of the second peripheral negative active section 2312j. An outer contour of the third peripheral negative active section 2312k is rectangular. The center of the central negative active section 2312h is the center O1 of the first negative active material layer. The outer contour of the central negative active section 2312h is rectangular, both an inner contour and an outer contour of the first peripheral negative active section 2312i are rectangular, both an inner contour and an outer contour of the second peripheral negative active section 2312j are rectangular, and both an inner contour and an outer contour of the third peripheral negative active section 2312k are rectangular.

In some embodiments, as shown in FIG. 14, the outer contour of the central negative active section 2312h is an oval shape. The inner contour and the outer contour of the first peripheral negative active section 2312i are of an oval shape, the inner contour and the outer contour of the second peripheral negative active section 2312j are of an oval shape, the inner contour of the third peripheral negative active section 2312k is an oval shape, and the outer contour of the third peripheral negative active section is rectangular. An oval central negative active section 2312h contributes to being close to expansive deformation status of the first negative active material layer 2312 when the abutting region B1 abuts against the housing 21, and reducing the risk of lithium plating due to extrusion of an electrotype when the abutting region B1 abuts against the housing 21.

In some embodiments, the particle size of the active material of the first negative active material layer 2312 is smaller than that of the second negative active material layer 2313. In the charging/discharging process, lithium ions are easy to diffuse in the first negative active material layer 2312 and uniform in distribution in the first negative active material layer 2312 and difficult to gather in the first negative active material layer 2312, thereby lowering the risk of lithium plating and improving rapid charging performance of the first negative active material layer 2312.

In some embodiments, in each first negative active material layer 2312, the particle size of the active material in one negative active section if closer to the center O1 of the first negative active material layer is smaller.

In some embodiments, illustratively, please continue to refer to FIG. 14, the third peripheral negative active section 2312k is the area with the greatest particle size of the active material in the first negative active material layer 2312, the particle size of the active material in the third peripheral negative active section 2312k is D, and the particle size of the active material in the second peripheral negative active section 2312j, the particle size of the active material in the first peripheral negative active section 2312i and the particle size of the active material in the central negative active section 2312h are 0.8D, 0.6D and 0.4D, respectively. When the electrode assembly 23 expands, the central negative active section 2312h expands most seriously, and the particle size of the active material in the central negative active section 2312h is smallest, therefore, the diffusion ability of lithium ions in the central negative active section 2312h can be improved, and lithium ions are difficult to gather in the central negative active section 2312h so as to reduce the risk of lithium plating.

Figure 15:
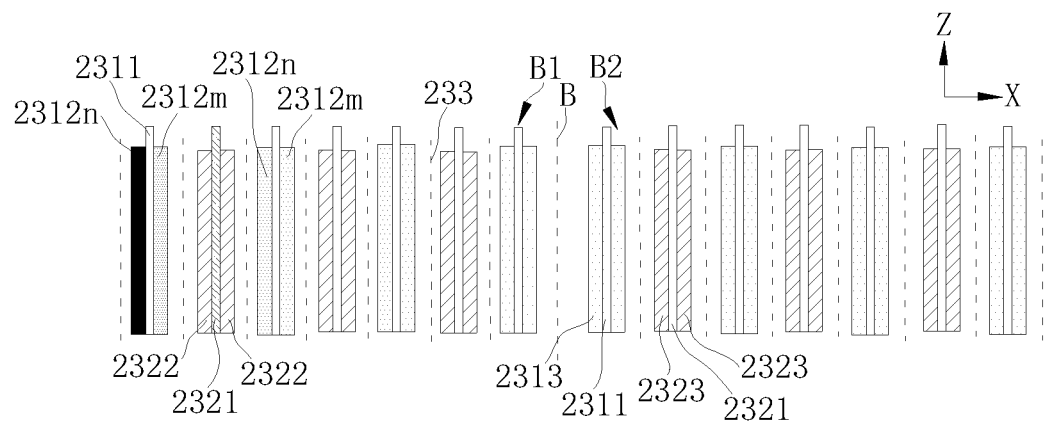
FIG. 15 is a schematically structural diagram of the electrode assembly provided by further some embodiments of the present application.

In some embodiments, as shown in FIG. 15, the active material capacities per unit area of the first negative active material layers 2312 on two surfaces of the negative current collector 2311 are different along the thickness direction X of the electrode assembly 23. The active material capacity per unit area of the first negative active material layer 2312 on the surface at one side of the negative current collector 2311 closer to the thickness central surface B is less than that of the first negative active material layer 2312 on the surface at one side of the negative current collector 2311 far away from the thickness central surface B. As shown in FIG. 15, in the abutting region B1, the active material capacity per unit area of an inner negative active material layer 2312m at the inner side of the negative current collector 2311 is less than that of an outer negative active material layer 2312n. The inner side and the outer side of the negative current collector 2311 are defined relative to the thickness central surface B, i.e., one side closer to the thickness central surface B is the inner side, and one side further away from the thickness central surface B is the outer side.

In some embodiments, the positive plate 232 is improved to reduce the risk of lithium plating due to extrusion of an electrolyte when the abutting region B1 abuts against the housing 21.

Figure 16:
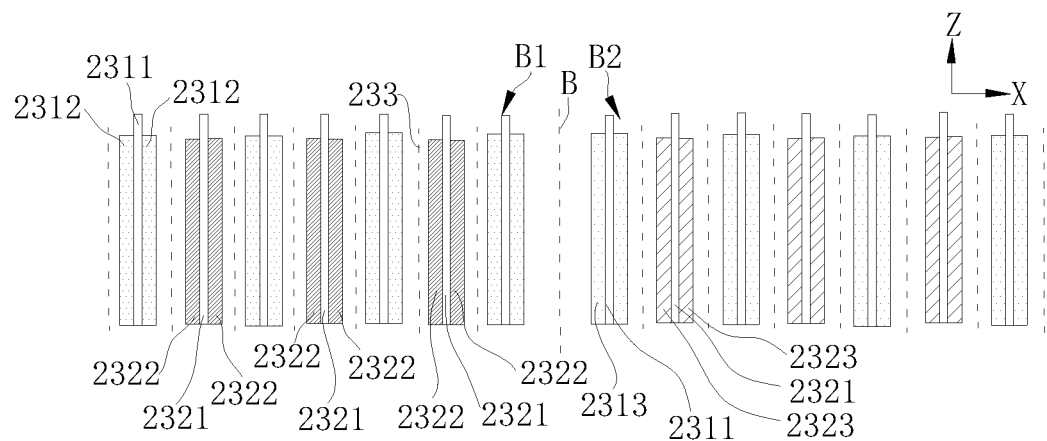
FIG. 16 is a schematically structural diagram of the electrode assembly provided by yet some embodiments of the present application.

In some embodiments, as shown in FIG. 16, an active material capacity per unit area of the first positive active material layer 2322 is less than that of the second positive active material layer 2323.

In some embodiments, along the thickness direction X, active material capacities per unit area of the second positive active material layers 2323 on two surfaces of one positive current collector 2321 on arbitrary one layer are same, and the active material capacities per unit area of the second positive active material layers 2323 can represent the active material capacities per unit area of the second positive active material layers 2323 on two surfaces of the positive current collector 2321.

When an active material capacity per unit area of the second positive active material layer 2323 of the non-abutting region B2 not abutting against the housing 21 meets a design requirement, i.e., when the active material capacity per unit area of the second positive active material layer 2323 of the non-abutting region B2 meets a second preset value, lithium plating has difficultly taking place in the second negative active material layer 2313 of the non-abutting region B2. When the active material capacity per unit area of the first positive active material layer 2322 of the abutting region B1 is less than that of the second positive active material layer 2323 of the non-abutting region B2, i.e., the active material capacity per unit area of the first positive active material layer 2322 is less than a second preset value, it corresponds to lowering the active material capacity per unit area of the first positive active material layer 2322, in such a case, the first negative active material layer 2312 can receive lithium ions de-intercalating from the first positive active material layer 2322, and the possibility of lithium plating in the first negative active material layer 2312 of the abutting region B1 is low. Therefore, the risk of lithium plating due to extrusion of an electrolyte when the abutting region B1 abuts against the housing 21 can be effectively reduced.

It should be explained that, the active material capacity per unit area of the first positive active material layer 2322 refers to a ratio of an active material capacity of the first positive active material layer 2322 to a total area of the first positive active material layer 2322, and the active material capacity per unit area of the second positive active material layer 2323 refers to a ratio of an active material capacity of the second positive active material layer 2323 to a total area of the second positive active material layer 2323. It should be further explained that, the active material capacity of the first positive active material layer 2322 is E1, and the area of the first positive active material layer 2322 is G1, so that the unit area capacity per unit area EG1 of the first positive active material layer 2322 equals to E1/G1. The active material capacity of the second positive active material layer 2323 is E2, and the area of the second positive active material layer 2323 is G2, so that the unit area capacity per unit area EG2 of the second positive active material layer 2323 equals to E2/G2.

There are many factors capable of influencing the active material capacity per unit area of the first positive active material layer 2322 and the active material capacity per unit area of the second positive active material layer 2323. Therefore, there are many ways to achieve that the active material capacity per unit area of the first positive active material layer 2322 is greater than that of the second positive active material layer 2323.

In some embodiments, a capacity per gram of an active material of the first positive active material layer 2322 is greater than that of an active material of the second positive active material layer 2323.

By reducing the capacity per gram of the active material of the first positive active material layer 2322 of the abutting region B1, the active material capacity per unit area of the first positive active material layer 2322 of the abutting region B1 is lowered, so that the active material capacity per unit area of the first positive active material layer 2322 of the abutting region B1 is less than that of the second positive active material layer of the non-abutting region B2. Therefore, the risk of lithium plating due to extrusion of an electrolyte when the abutting region B1 abuts against the housing 21 is effectively reduced.

The capacity per gram is related to the active material in the first positive active material layer 2322 and the active material in the second positive active material layer 2323. For example, the active materials of the first positive active material layer 2322 and the second positive active material layer 2323 are different, the active material of the first positive active material layer 2322 is lithium iron phosphate, and the active material of the second positive active material layer 2323 is ternary lithium. The lithium iron phosphate has a material activity worse than that of the ternary lithium, so that lithium de-intercalation ability of the first positive active material layer 2322 is worse than that of the second positive active material layer 2323 to reduce the influence from extrusion of an electrolyte to the abutting region B1.

In some embodiments, a ratio of a weight of an active material of the first positive active material layer 2322 to a weight of the first positive active material layer 2322 is less than a ratio of a weight of an active material of the second positive active material layer 2323 to a weight of the second positive active material layer 2323. Both the first positive active material layer 2322 and the second positive active material layer 2323 include an active material, a binder and a conductive agent, respectively. By reducing the active material in the first positive active material layer 2322, the proportion of the active material in the first positive active material layer 2322 is lowered so as to reduce the active material capacity per unit area of the first positive active material layer 2322, so that the active material capacity per unit area of the first positive active material layer 2322 is greater than that of the second positive active material layer 2323.

In the abutting region B1, along the thickness direction X, the closer a position approaches the housing 21, the more seriously it is extruded with the housing 21.

Figure 17:
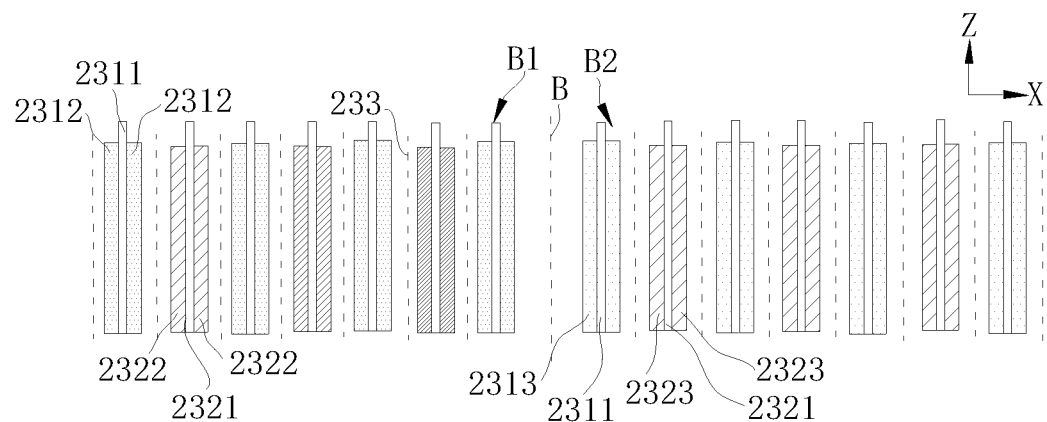
FIG. 17 is a schematically structural diagram of the electrode assembly provided by another some embodiments of the present application.

Based on this, as shown in FIG. 17, in some embodiments, along the thickness direction X, an active material capacity per unit area of one first positive active material layer 2322 of two adjacent first positive active material layers 2322 is less than that of the other first positive active material layer 2322, and the other first positive active material layer 2322 is closer to the thickness central surface B than the one first positive active material layer 2322. Understandably, in the abutting region B1, along the thickness direction X, the further the first positive active material layer 2322 is away from the thickness central surface B (closer to the side wall 211 of the housing 21), the greater its active material capacity per unit area is, so that the risk of lithium plating due to extrusion of an electrolyte when the abutting region B1 abuts against the housing 21 can be effectively reduced.

More ways can be used to achieve that an active material capacity per unit area of one first positive active material layer 2322 of two adjacent first positive active material layers 2322 closer to the housing 21 is less than that of the other first positive active material layer 2322.

In some embodiments, a capacity per gram of an active material of one first positive active material layer 2322 of two adjacent first positive active material layers 2322 is less than that of an active material of the other first positive active material layer 2322, and the other first positive active material layer 2322 is closer to the thickness central surface B than the one first positive active material layer 2322. Understandably, in the abutting region B1, along the thickness direction X, the further the first positive active material layer 2322 is away from the thickness central surface B (closer to the side wall 211 of the housing 21), the less its capacity per gram of the first positive active material layer 2322 is.

The capacity per gram is related to the active material in the first positive active material layer 2322. For example, the active materials of two adjacent first positive active material layers 2322 are different, the active material of the first positive active material layer 2322 close to the housing 21 is lithium iron phosphate, and the active material of the other positive active material layer is ternary lithium, the lithium de-intercalation ability of the first positive active material layer 2322 of two adjacent first positive active material layers 2322 closer to the housing 21 is worse than that of the other first positive active material layer 2322 to reduce the influence from extrusion of an electrolyte to the abutting region B1.

In some embodiments, a ratio of a weight of an active material of one first positive active material layer 2322 of two adjacent first positive active material layers 2322 to a weight of the one first positive active material layer 2322 is less than a ratio of a weight of an active material of the other first positive active material layer 2322 to a weight of the other first positive active material layer 2322, and the other first positive active material layer 2322 is closer to the thickness central surface B than the one first positive active material layer 2322. Understandably, in the abutting region B1, along the thickness direction X, the further the first positive active material layer 2322 is away from the thickness central surface B (closer to the side wall 211 of the housing 21), the less the ratio of a weight of an active material of the first positive active material layer 2322 to a weight of the first positive active material layer 2322 is.

By lowering the active material in one first positive active material layer 2322 of two adjacent first positive active material layers 2322 closer to the housing 21, a proportion of the active material in the first positive active material layer 2322 is lowered, thereby lowering the active material capacity per unit area of the first positive active material layer 2322 and enabling the active material capacity per unit area of the first positive active material layer 2322 closer to the housing 21 to be less than that of the other first positive active material layer 2322.

With regard to each first positive active material layer 2322, when the electrode assembly 23 expands, the closer a position approaches a center O3 of the first positive active material layer, the greater the extrusion force it bears, and the higher the possibility that the electrolyte is extruded becomes.

Figure 18:
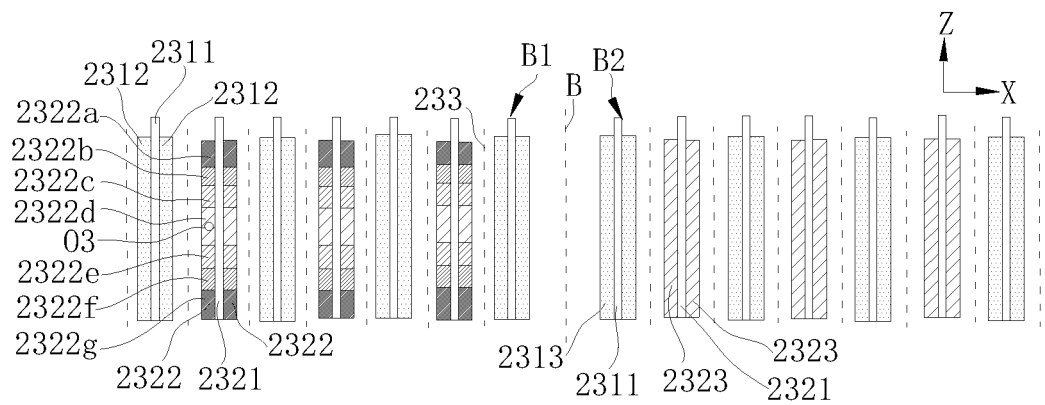
FIG. 18 is a schematically structural diagram of the electrode assembly provided by further some embodiments of the present application (a first positive active material layer includes a plurality of positive active sections)

Based on this, in some embodiments, as shown in FIG. 18, the first positive active material layer 2322 includes a plurality of positive active sections, an active material capacity per unit area of one positive active section of two adjacent positive active sections is less than that of the other positive active section, and the one positive active section is closer to a center O3 of the first positive active material layer than the other positive active section. Understandably, in the abutting region B1, a closer distance of the positive active section to the center O3 of the first positive active material layer produces a less active material capacity per unit area. By dividing the first positive active material layer 2322 into a plurality of positive active sections, and rendering that the closer the positive active section approaches the center O3 of the first positive active material layer, the less its active material capacity per unit area is, the lithium de-intercalation ability of the positive active section closer to the center of the first positive active material layer 2322 is lowered, the position closer to the center of the first negative active material layer 2312 is less influenced by extrusion of the electrotype, and the risk of lithium plating due to extrusion of an electrolyte when the abutting region B1 abuts against the housing 21 can be effectively reduced.

In some embodiments, a capacity per gram of an active material of one positive active section of two adjacent positive active sections is less than that of an active material of the other positive active section, and the one positive active section is closer to the center O3 of the first positive active material layer than the other positive active section, so that the active material capacity per unit area of the positive active section closer to the center O3 of the first positive active material layer is less.

In some embodiments, a ratio of a weight of an active material of one positive active section of two adjacent positive active sections to a weight of the one positive active section is less than a ratio of a weight of an active material of the other positive active section to a weight of the other positive active section, and the one positive active section is closer to the center O3 of the first positive active material layer than the other positive active section, so that the active material capacity per unit area of the positive active section closer to the center O3 of the first positive active material layer is less. By lowering the active material in one positive active section of two adjacent positive active sections closer to the center O3 of the first positive active material layer, a proportion of the active material in the positive active section is lowered, thereby lowering the active material capacity per unit area of the positive active section to enable the active material capacity per unit area of the positive active section closer to the center O3 of the first positive active material layer to be less than that of the other positive active section.

The positive active section may be varied in shape, and each positive active section may have same or different shape(s).

Figure 19:
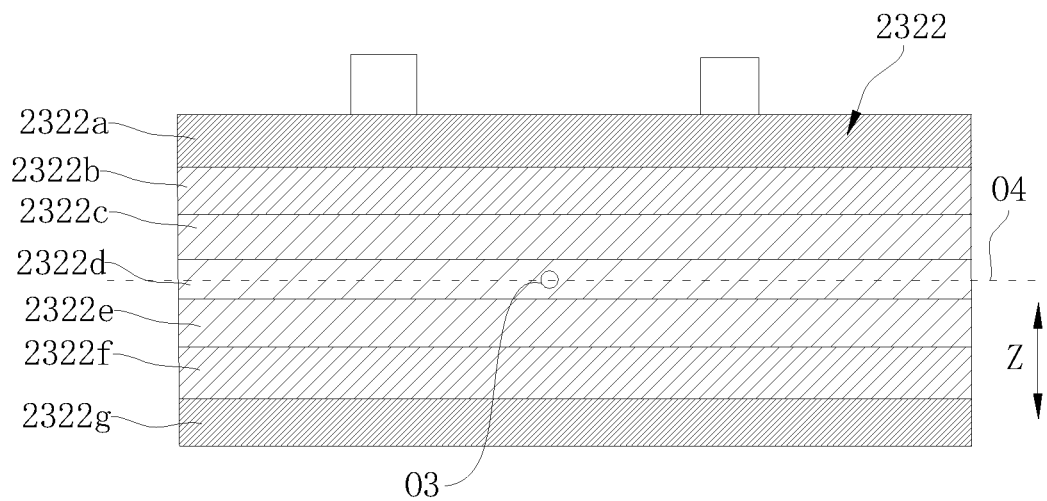
FIG. 19 is a schematically structural diagram of the first positive active material layer provided by some embodiments of the present application.
Figure 20:
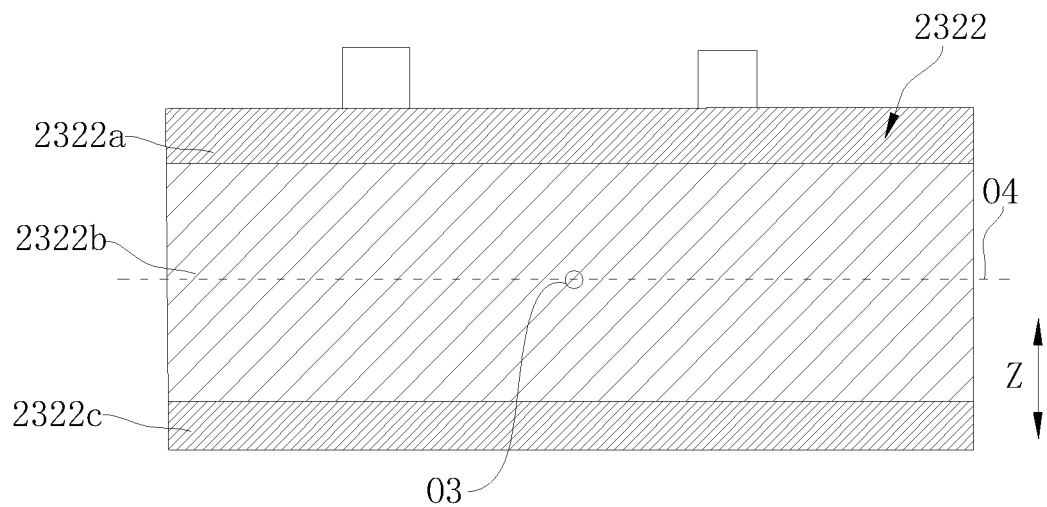
FIG. 20 is a schematically structural diagram of the first positive active material layer provided by yet some embodiments of the present application.

In some embodiments, as shown in FIGS. 19 and 20, each positive active section is a strip shape. The positive active sections are arrayed along the direction of a winding axis. The positive active section is a strip shape, so a negative active material layer is easy to coat. The number of the positive active sections is odd.

As shown in FIG. 19, seven positive active sections are provided successively along the winding axis direction Z: a first positive active section 2322a, a second positive active section 2322b, a third positive active section 2322c, a fourth positive active section 2322d, a fifth positive active section 2322e, a sixth positive active section 2322f and a seventh positive active section 2322g. In the winding axis direction Z, a central surface of the fourth positive active section 2322d and a central surface O4 of the first positive active material layer coincide with each other and pass through the center O3 of the first positive active material layer, the first positive active section 2322a and the seventh positive active section 2322g are symmetric about the central surface O4 of the first positive active material layer, the second positive active section 2322b and the sixth positive active section 2322f are symmetric about the central surface O4 of the first positive active material layer, and the third positive active section 2322c and the fifth positive active section 2322e are symmetric about the central surface O4 of the first positive active material layer.

The active material capacity per unit area of the fourth positive active section 2322d is less than that of the third positive active section 2322c, the active material capacity per unit area of the third positive active section 2322c is less than that of the second positive active section 2322b, and the active material capacity per unit area of the second positive active section 2322b is less than that of the first positive active section 2322a; the active material capacity per unit area of the fourth positive active section 2322d is less than that of the fifth positive active section 2322e, the active material capacity per unit area of the fifth positive active section 2322e is less than that of the sixth positive active section 2322f, and the active material capacity per unit area of the sixth positive active section 2322f is less than that of the seventh positive active section 2322g.

In some embodiments, as shown in FIG. 20, three positive active sections are provided successively along the winding axis direction Z: a first positive active section 2322a, a second positive active section 2322b and a third positive active section 2322c. In the winding axis direction Z, the central surface of the second positive active section 2322b and the central surface O4 of the first positive active material layer coincide with each other and pass through the center O3 of the first positive active material layer, the first positive active section 2322a and the third positive active section 2322c are symmetric about the central surface O4 of the first positive active material layer.

The active material capacity per unit area of the second positive active section 2322b is less than that of the first positive active section 2322a, and the active material capacity per unit area of the second positive active section 2322b is less than that of the third positive active section 2322c. The active material capacity per unit area of the first positive active section 2322a is as same as that of the third positive active section 2322c.

When the positive active sections are of a strip shape and are arrayed along the winding axis direction Z, the distance of each positive active section to the center O3 of the first positive active material layer can be understood as a distance relative to the central surface O4 of the first positive active material layer.

Figure 21:
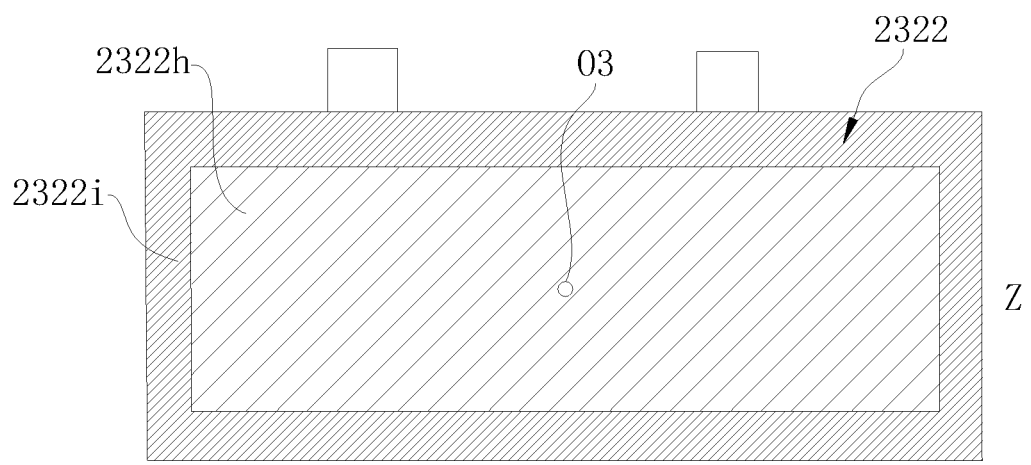
FIG. 21 is a schematically structural diagram of the first positive active material layer provided by another some embodiments of the present application.
Figure 22:
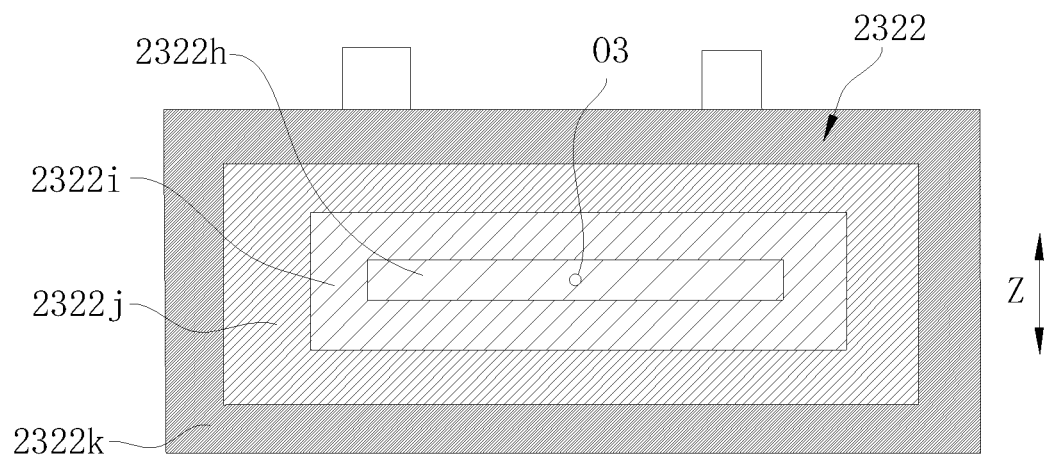
FIG. 22 is a schematically structural diagram of the first positive active material layer provided by further some embodiments of the present application.
Figure 23:
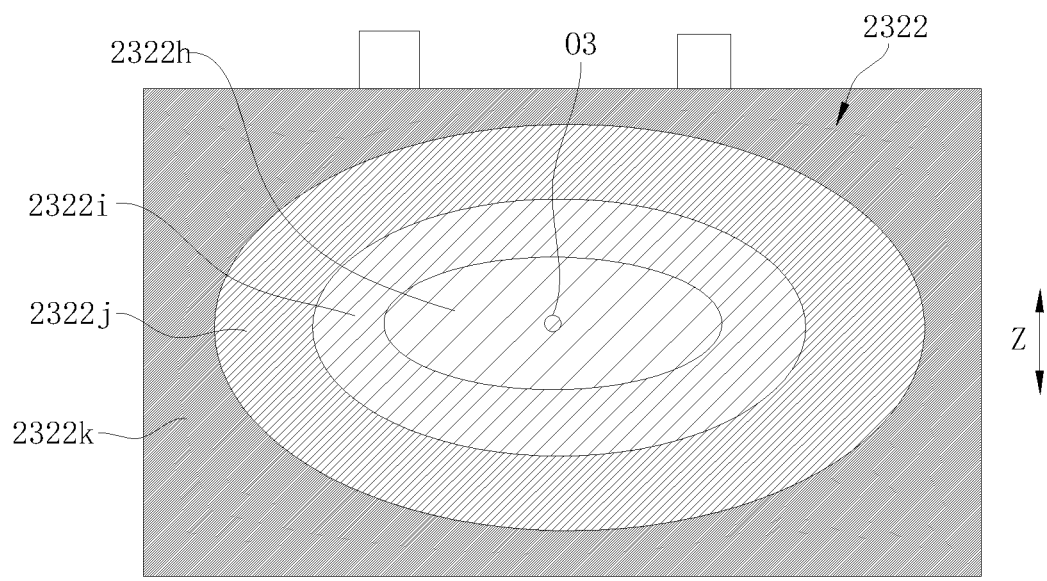
FIG. 23 is a schematically structural diagram of the first positive active material layer provided by further some embodiments of the present application (a central positive active section is an oval shape)

In some embodiments, as shown in FIGS. 21 to 23, the plurality of positive active sections include a central positive active section 2322h and at least one peripheral positive active section, each peripheral positive active section is annular and encircles the central positive active section 2322h, the central positive active section 2322h and the at least one peripheral positive active section are radially distributed around the center O3 of the first positive active material layer.

The active material capacity per unit area of the central positive active section 2322h is less than that of the peripheral positive active section.

In some embodiments, as shown in FIG. 21, the central positive active section 2322h is rectangular, and one peripheral positive active section is provided and defined as a first peripheral positive active section 2322i. An inner contour of the peripheral positive active section is rectangular and coincides with an outer contour of the central positive active section 2322h, and an outer contour of the peripheral positive active section is rectangular. The center of the central positive active section 2322h is the center O3 of the first positive active material layer.

In some embodiments, as shown in FIG. 22, three peripheral positive active sections are provided: a first peripheral positive active section 2322i, a second peripheral positive active section 2322j and a third peripheral positive active section 2322k. The first peripheral positive active section 2322i encircles the central positive active section 2322h, and an inner contour of the first peripheral positive active section 2322i coincides with an outer contour of the central positive active section 2322h. The second peripheral positive active section 2322j encircles the first peripheral positive active section 2322i, and an inner contour of the second peripheral positive active section 2322j coincides with an outer contour of the first peripheral positive active section 2322i. The third peripheral positive active section 2322k encircles the second peripheral positive active section 2322j, and an inner contour of the third peripheral positive active section 2322k coincides with an outer contour of the second peripheral positive active section 2322j. An outer contour of the third peripheral positive active section 2322k is rectangular. The center of the central positive active section 2322h is the center O3 of the first positive active material layer. The outer contour of the central positive active section 2322h is rectangular, both an inner contour and an outer contour of the first peripheral positive active section 2322i are rectangular, both an inner contour and an outer contour of the second peripheral positive active section 2322j are rectangular, and both an inner contour and an outer contour of the third peripheral positive active section 2322k are rectangular.

In some embodiments, as shown in FIG. 23, the outer contour of the central positive active section 2322h is an oval shape. An oval central positive active section 2322h contributes to being close to expansive deformation status of the first positive active material layer 2322 when the abutting region B1 abuts against the housing 21, and reducing the risk of lithium plating due to extrusion of an electrotype when the abutting region B1 abuts against the housing 21.

In some embodiments, the particle size of the active material of the first positive active material layer 2322 is greater than that of the second positive active material layer 2323. In the charging/discharging process, lithium ions have a low diffusion rate in the first positive active material layer and thus de-intercalation rate of lithium ions from the first positive active material layer is also lowered, thereby lowering the risk that the lithium ions de-intercalating from the first positive active material layer gather in the first negative active material layer, so that lithium plating is not easy to happen in the first negative active material layer.

In some embodiments, in each first positive active material layer 2322, the particle size of the active material in one positive active section if closer to the center O3 of the first positive active material layer is greater.

Illustratively, please continue to refer to FIG. 23, the central positive active section 2322h is the area with the greatest particle size of the active material in the first positive active material layer 2322, the particle size of the active material in the central positive active section 2322h is K, and the particle size of the active material in the first peripheral positive active section 2322i, the particle size of the active material in the second peripheral positive active section 2322j and the particle size of the active material in the third peripheral positive active section 2322k are 0.8K, 0.6K and 0.4K, respectively.

Figure 24:
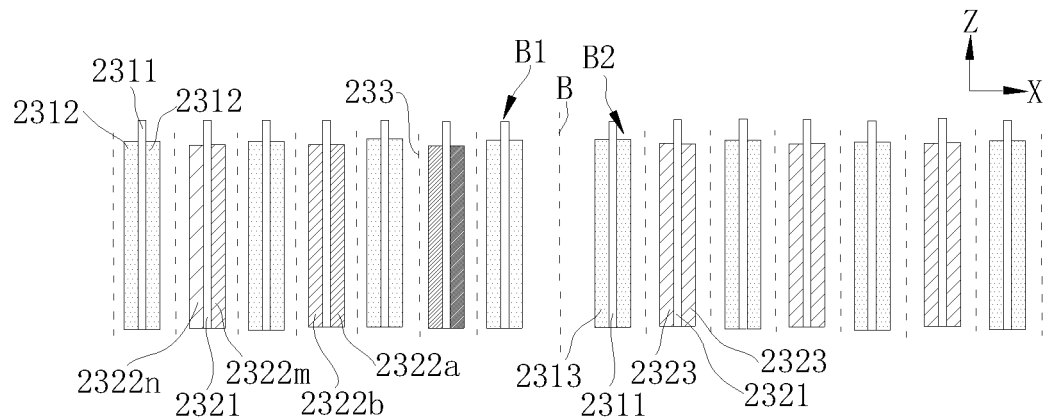
FIG. 24 is a schematically structural diagram of the electrode assembly provided by yet some embodiments of the present application (active material capacities per unit area of the first positive active material layers on two surfaces of a positive current collector are different)

In some embodiments, as shown in FIG. 24, along the thickness direction X of the electrode assembly 23, the active material capacities per unit area of the first positive active material layers 2322 on two surfaces of the positive current collector 2321 are different. The active material capacity per unit area of the first positive active material layer 2322 on the surface at one side of the positive current collector 2321 closer to the thickness central surface B is less than that of the first positive active material layer 2322 on the surface at one side of the positive current collector 2321 far away from the thickness central surface B. That is to say, as shown in FIG. 24, in the abutting region B1, the active material capacity per unit area of an inner positive active material layer 2322m at the inner side of the positive current collector 2321 is greater than that of an outer positive active material layer 2322n. The inner side and the outer side of the positive current collector 2321 are defined relative to the thickness central surface B, i.e., one side closer to the thickness central surface B is the inner side, and one side further away from the thickness central surface B is the outer side.

Figure 25:
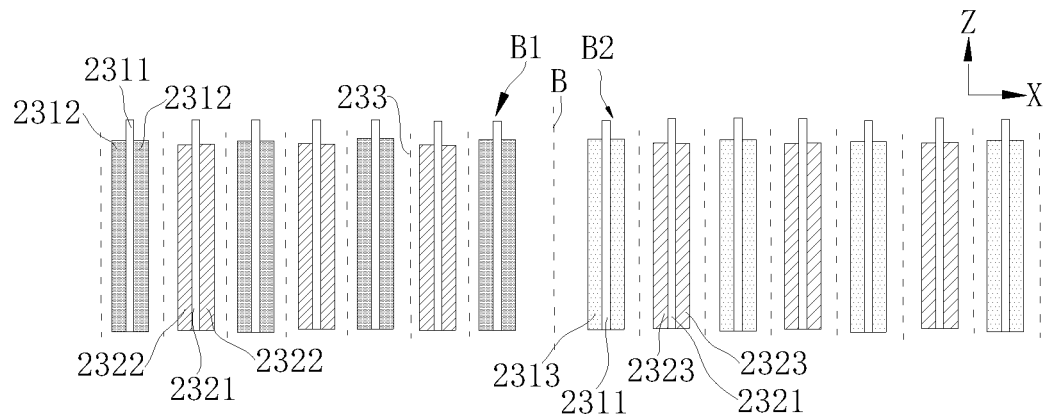
FIG. 25 is a schematically structural diagram of the electrode assembly provided by another some embodiments of the present application (both the first negative active material layer and the first positive active material layer are improved)

In some embodiments, as shown in FIG. 25, both the negative plate 231 and the positive plate 232 can be improved so that the active material capacity per unit area of the first negative active material layer 2312 is greater than that of the second negative active material layer 2313, and the active material capacity per unit area of the first positive active material layer 2322 is less than that of the second positive active material layer 2323.

Figure 26:
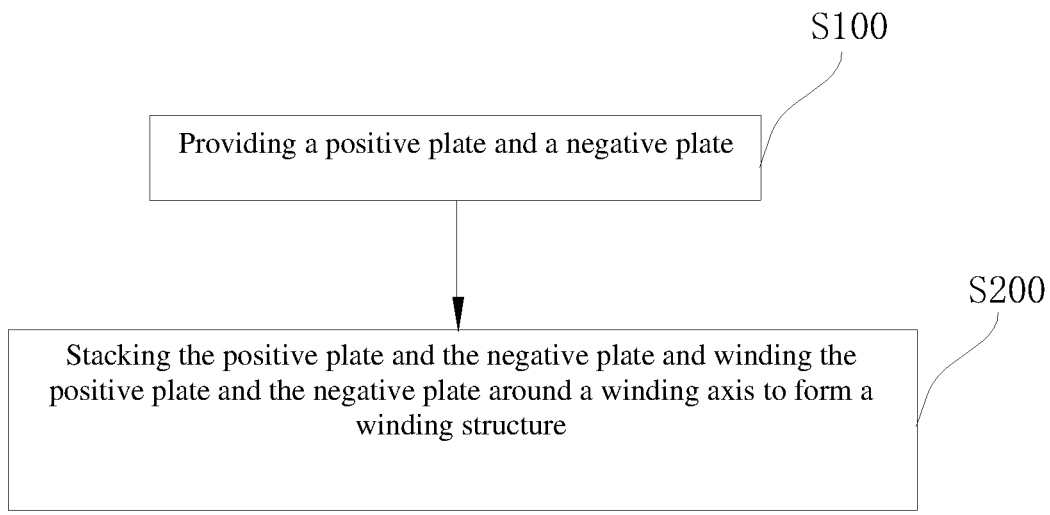
FIG. 26 is a flow diagram of a manufacturing method of the electrode assembly provided by some embodiments of the present application.

As shown in FIG. 26, the embodiments of the present application further provide a manufacturing method of an electrode assembly 23, including:

S100: providing a positive plate 232 and a negative plate 231;

S200: stacking the positive plate 232 and the negative plate 231 and winding the positive plate 232 and the negative plate 231 around a winding axis to form a winding structure, so that the electrode assembly 23 includes an abutting region B1 used for abutting against a housing 21 and a non-abutting region B2 not abutting against the housing 21 at two sides of a thickness central surface B of the electrode assembly, and the thickness central surface B is perpendicular to a thickness direction X of the electrode assembly 23 and passes through the winding axis.

The negative plate 231 includes a plurality of first negative active material layers 2312 located in the abutting region B1 and stacked along the thickness direction X, and a plurality of second negative active material layers 2313 located in the non-abutting region B2 and stacked along the thickness layer X; the positive plate 232 includes a plurality of first positive active material layers 2322 located in the abutting region B1 and stacked along the thickness direction X, and a plurality of second positive active material layers 2323 located in the non-abutting region B2 and stacked along the thickness direction X; an active material capacity per unit area of the first negative active material layer 2312 is greater than that of the second negative active material layer 2313; and/or, an active material capacity per unit area of the first positive active material layer 2322 is less than that of the second positive active material layer 2323.

It should be noted that, if related structures of the electrode assembly 23 are manufactured by the above manufacturing method of the electrode assembly 23, the electrode assembly 23 provided by the above embodiments can be taken as a reference.

Figure 27:
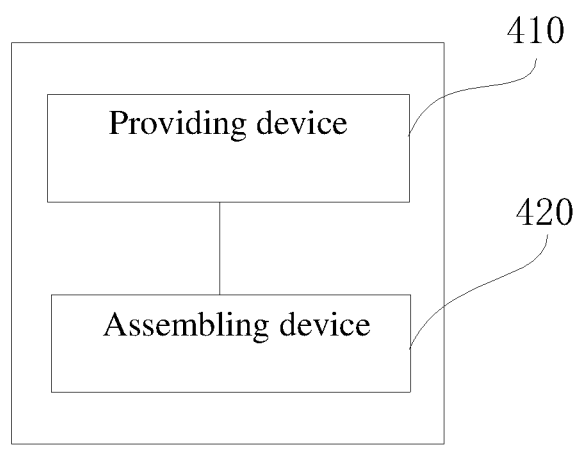
FIG. 27 is a structural diagram of a manufacturing device of the electrode assembly provided by some embodiments of the present application.

As shown in FIG. 27, the embodiments of the present application further provide a manufacturing device 400 of an electrode assembly, including: a providing device 410 used for providing a positive plate 232 and a negative plate 231; an assembling device 420 used for stacking the positive plate 232 and the negative plate 231 and winding the positive plate 232 and the negative plate 231 around a winding axis to form a winding structure, so that the electrode assembly 23 includes an abutting region B1 used for abutting against a housing 21 and a non-abutting region B2 not abutting against the housing 21 at two sides of a thickness central surface B of the electrode assembly, and the thickness central surface B is perpendicular to a thickness direction X of the electrode assembly 23 and passes through the winding axis; where the negative plate 231 includes a plurality of first negative active material layers 2312 located in the abutting region B1 and stacked along the thickness direction X, and a plurality of second negative active material layers 2313 located in the non-abutting region B2 and stacked along the thickness direction X; the positive plate 232 includes a plurality of first positive active material layers 2322 located in the abutting region B1 and stacked along the thickness direction X, and a plurality of second positive active material layers 2323 located in the non-abutting region B2 and stacked along the thickness direction X; an active material capacity per unit area of the first negative active material layer 2312 is greater than that of the second negative active material layer 2313; and/or, an active material capacity per unit area of the first positive active material layer 2322 is less than that of the second positive active material layer 2323.

The present application has been described by referring to recommended embodiments, but without departing from the scope of the present application, improvements on the present application and substitutions for components in the present application with equivalents are allowed. In particular, as long as there are no structural conflicts, all technical features mentioned in each embodiment may be combined in any form. The present application is not limited to the particular embodiments disclosed hereby, but includes all technical solutions that fall into the scope claimed by the claims.

What is claimed is:

1. An electrode assembly configured to be accommodated in a housing, wherein the electrode assembly comprises a positive plate and a negative plate, and the positive plate and the negative plate are stacked and wound around a winding axis;

the electrode assembly comprises an abutting region configured to abut against the housing and a non-abutting region not abutting against the housing, the abutting region and the non-abutting region respectively located on two sides of a plane of the electrode assembly, and the plane is normal to a thickness direction of the electrode assembly and passes through the winding axis;

wherein when viewing a flat area in the thickness direction of the electrode assembly, the negative plate comprises a plurality of first negative active material layers located in the abutting region and stacked along the thickness direction, and a plurality of second negative active material layers located in the non-abutting region and stacked along the thickness direction; the positive plate comprises a plurality of first positive active material layers located in the abutting region and stacked along the thickness direction, and a plurality of second positive active material layers located in the non-abutting region and stacked along the thickness direction; and an active material capacity per unit area of the first negative active material layers is greater than that of the second negative active material layers; and/or, an active material capacity per unit area of the first positive active material layers is less than that of the second positive active material layers.

2. The electrode assembly according to claim 1, wherein a capacity per gram of an active material of the first negative active material layers is greater than that of an active material of the second negative active material layers; and/or, a capacity per gram of an active material of the first positive active material layers is less than that of an active area of the second positive active material layers.

3. The electrode assembly according to claim 1, wherein a ratio of a weight of the active material of the first negative active material layers to a weight of the first negative active material layers is greater than a ratio of a weight of the active material of the second negative active material layers to a weight of the second negative active material layers; and/or, a ratio of a weight of the active material of the first positive active material layers to a weight of the first positive active material layers is less than a ratio of a weight of the active material of the second positive active material layers to a weight of the second positive active material layers.

4. The electrode assembly according to claim 1, wherein an active material capacity per unit area of one first negative active material layer of two adjacent first negative active material layers is greater than that of the other first negative active material layer, and the other first negative active material layer is closer to the plane than the one first negative active material layer; and/or, an active material capacity per unit of one first positive active material layer of two adjacent first positive active material layers is less than that of the other first positive active material layer, and the other first positive active material layer is closer to the plane than the one first positive active material layer.

5. The electrode assembly according to claim 4, wherein a capacity per gram of an active material of one first negative active material layer of two adjacent first negative active material layers is greater than that of the other first negative active material layer, and the other first negative active material layer is closer to the plane than the one first negative active material layer; and/or, a capacity per gram of an active material of one first positive active material layer of two adjacent first positive active material layers is less than that of the other first positive active material layer, and the other first positive active material layer is closer to the plane than the one first positive active material layer.

6. The electrode assembly according to claim 4, wherein a ratio of a weight of an active material of one first negative active material layer of two adjacent first negative active material layers to a weight of the one first negative active material layer is greater than a ratio of a weight of an active material of the other first negative active material layer to a weight of the other first negative active material layer, and the other first negative active material layer is closer to the plane than the one first negative active material layer; and/or, a ratio of a weight of an active material of one first positive active material layer of two adjacent first positive active material layers to a weight of the one first positive active material layer is less than a ratio of a weight of an active material of the other first positive active material layer to a weight of the other first positive active material layer, and the other first positive active material layer is closer to the plane than the one first positive active material layer.

7. The electrode assembly according to claim 1, wherein a first negative active material layer comprises a plurality of negative active sections, and a first positive active material layer comprises a plurality of positive active sections;

an active material capacity per unit area of one negative active section of two adjacent negative active sections is greater than that of the other negative active section, and the one negative active section is closer to a center of the first negative active material layer than the other negative active section; and/or, an active material capacity per unit area of one positive active section of two adjacent positive active sections is less than that of the other positive active section, and the one positive active section is closer to a center of the first positive active material layer than the other positive active section.

8. The electrode assembly according to claim 7, wherein a capacity per gram of an active material of one negative active section of two adjacent negative active sections is greater than that of the other negative active section, and the one negative active section is closer to the center of the first negative active material layer than the other negative active section; and/or, a capacity per gram of an active material of one positive active section of two adjacent positive active sections is less than that of the other positive active section, and the one positive active section is closer to the center of the first positive active material layer than the other positive active section.

9. The electrode assembly according to claim 7, wherein a ratio of a weight of an active material of one negative active section of two adjacent negative active sections to a weight of the one negative active section is greater than a ratio of a weight of an active material of the other negative active section to a weight of the other negative active section, and the one negative active section is closer to the center of the first negative active material layer than the other negative active section; and/or, a ratio of a weight of an active material of one positive active section of two adjacent positive active sections to a weight of the one positive active section is less than a ratio of a weight of an active material of the other positive active section to a weight of the other positive active section, and the one positive active section is closer to the center of the first positive active material layer than the other positive active section.

10. The electrode assembly according to claim 7, wherein each negative active section is a strip shape, and the plurality of negative active sections are arranged along a direction of the winding axis; and/or, each positive active section is a strip shape, and the plurality of positive active sections are arranged along the direction of the winding axis.

11. The electrode assembly according to claim 7, wherein the plurality of negative active sections comprise a central negative active section and at least one peripheral negative active section, each peripheral negative active section is annular and encircles the central negative active section, the central negative active section and the at least one peripheral negative active section are radially distributed around the center of the first negative active material layer; and/or, the plurality of positive active sections comprise a central positive active section and at least one peripheral positive active section, each peripheral positive active section is annular and encircles the central positive active section, the central positive active section and the at least one peripheral positive active section are radially distributed around the center of the first positive active material layer.

12. The electrode assembly according to claim 11, wherein the central negative active section and/or the central positive active section are of an oval shape.

13. A battery cell, comprising:
a housing;
the electrode assembly according to claim 1, the electrode assembly being accommodated in the housing, the abutting region being configured to abut against the housing, and the non-abutting region being configured to not abut against the housing.

14. The battery cell according to claim 13, wherein the battery cell comprises two electrode assemblies, the two electrode assemblies are arranged side by side along a thickness direction, and the abutting regions of the two electrode assemblies deviate from each other.

15. A battery, comprising the battery cell according to claim 13.

16. An electric apparatus, comprising the battery cell according to claim 13.

17. A manufacturing method of an electrode assembly, comprising:
providing a positive plate and a negative plate;
stacking the positive plate and the negative plate and winding the positive plate and the negative plate around a winding axis to form a winding structure, so that the electrode assembly comprises an abutting region configured to abut against a housing and a non-abutting region not abutting against the housing, the abutting region and the non-abutting region respectively located on two sides of a plane of the electrode assembly, and the plane is normal to a thickness direction of the electrode assembly and passes through the winding axis;
wherein when viewing a flat area in the thickness direction of the electrode assembly,
the negative plate comprises a plurality of first negative active material layers located in the abutting region and stacked along the thickness direction, and a plurality of second negative active material layers located in the non-abutting region and stacked along the thickness direction; the positive plate comprises a plurality of first positive active material layers located in the abutting region and stacked along the thickness direction, and a plurality of second positive active material layers located in the non-abutting region and stacked along the thickness direction; and
an active material capacity per unit area of the first negative active material layers is greater than that of the second negative active material layers; and/or, an active material capacity per unit area of the first positive active material layers is less than that of the second positive active material layers.

18. The manufacturing method according to claim 17, wherein a capacity per gram of an active material of the first negative active material layers is greater than that of an active material of the second negative active material layers; and/or, a capacity per gram of an active material of the first positive active material layers is less than that of an active area of the second positive active material layers.

19. A manufacturing device of an electrode assembly, comprising:
a providing device configured to provide a positive plate and a negative plate;
an assembling device configured to stack the positive plate and the negative plate and wind the positive plate and the negative plate around a winding axis to form a winding structure, so that the electrode assembly comprises an abutting region configured to abut against a housing and a non-abutting region not abutting against the housing, the abutting region and the non-abutting region respectively located on two sides of a plane of the electrode assembly, and the plane is normal to a thickness direction of the electrode assembly and passes through the winding axis;
wherein when viewing a flat area in the thickness direction of the electrode assembly,
the negative plate comprises a plurality of first negative active material layers located in the abutting region and stacked along the thickness direction, and a plurality of second negative active material layers located in the non-abutting region and stacked along the thickness direction; the positive plate comprises a plurality of first positive active material layers located in the abutting region and stacked along the thickness direction, and a plurality of second positive active material layers located in the non-abutting region and stacked along the thickness direction; and
an active material capacity per unit area of the first negative active material layers is greater than that of the second negative active material layers; and/or, an active material capacity per unit area of the first positive active material layers is less than that of the second positive active material layers.

20. The manufacturing device according to claim 19, wherein a capacity per gram of an active material of the first negative active material layers is greater than that of an active material of the second negative active material layers; and/or, a capacity per gram of an active material of the first positive active material layers is less than that of an active area of the second positive active material layers.

* * * * *